United States Patent
Kawahata et al.

(10) Patent No.: US 9,991,828 B2
(45) Date of Patent: Jun. 5, 2018

(54) VOLTAGE LEVEL DETECTING DEVICE, MOTOR DRIVING APPARATUS, MOTOR DRIVING SYSTEM, AND METHOD FOR DETECTING VOLTAGE LEVEL

(71) Applicants: Koji Kawahata, Osaka (JP); Tetsuroh Tatebe, Hyogo (JP)

(72) Inventors: Koji Kawahata, Osaka (JP); Tetsuroh Tatebe, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/434,104

(22) Filed: Feb. 16, 2017

(65) Prior Publication Data
US 2017/0250630 A1    Aug. 31, 2017

(30) Foreign Application Priority Data
Feb. 29, 2016   (JP) .................................. 2016-037767

(51) Int. Cl.
*H02P 6/16* (2016.01)
*G03G 21/14* (2006.01)
*H02P 27/08* (2006.01)

(52) U.S. Cl.
CPC ............... *H02P 6/16* (2013.01); *G03G 21/14* (2013.01); *H02P 27/08* (2013.01)

(58) Field of Classification Search
USPC .......... 318/478, 479, 442, 500, 504, 400.06, 318/400.1
See application file for complete search history.

(56) References Cited

U.S. PATENT DOCUMENTS

| 5,446,404 A * | 8/1995 | Badyal | H03K 17/223 327/143 |
| 5,867,116 A * | 2/1999 | Nakamura | H03M 1/165 341/155 |
| 6,188,254 B1 * | 2/2001 | Choi | H03K 19/00384 326/21 |

(Continued)

FOREIGN PATENT DOCUMENTS

| JP | 2013-099023 | 5/2013 |
| JP | 2015-169528 | 9/2015 |
| JP | 2016-072861 | 5/2016 |

*Primary Examiner* — Bentsu Ro
(74) *Attorney, Agent, or Firm* — Harness, Dickey & Pierce, P.L.C.

(57) ABSTRACT

A voltage level detecting device is provided including comparators, a detection circuit, a trigger signal output circuit, a delayed control signal output circuit, a delayed comparison result signal output circuit, a circuit, and a control circuit. The comparators compare a voltage level of an input signal with each threshold level to generate and output a comparison result signal. The detection circuit detects a change in the comparison result signal and outputs a detection signal. The trigger signal output circuit outputs a trigger signal when a predetermined time has elapsed. The delayed control signal output circuit outputs a delayed control signal indicating a value of the control signal. The delayed comparison result signal output circuit outputs a delayed comparison result signal indicating the value of the comparison result signal. The circuit outputs a voltage level signal indicating a voltage level of the input signal. The control circuit outputs the control signal.

14 Claims, 21 Drawing Sheets

(56) References Cited

U.S. PATENT DOCUMENTS

| | | | |
|---|---|---|---|
| 6,784,810 B2 * | 8/2004 | Falik | H03M 11/02 |
| | | | 341/26 |
| 8,228,045 B2 * | 7/2012 | Murdock | G06G 7/12 |
| | | | 323/205 |
| 8,648,741 B2 * | 2/2014 | Thomas | H03M 1/0673 |
| | | | 341/131 |
| 2013/0106326 A1 | 5/2013 | Kamatani et al. | |
| 2015/0256328 A1 | 9/2015 | Kamatani | |
| 2015/0303846 A1 | 10/2015 | Tatebe | |
| 2016/0094211 A1 | 3/2016 | Tani et al. | |

* cited by examiner

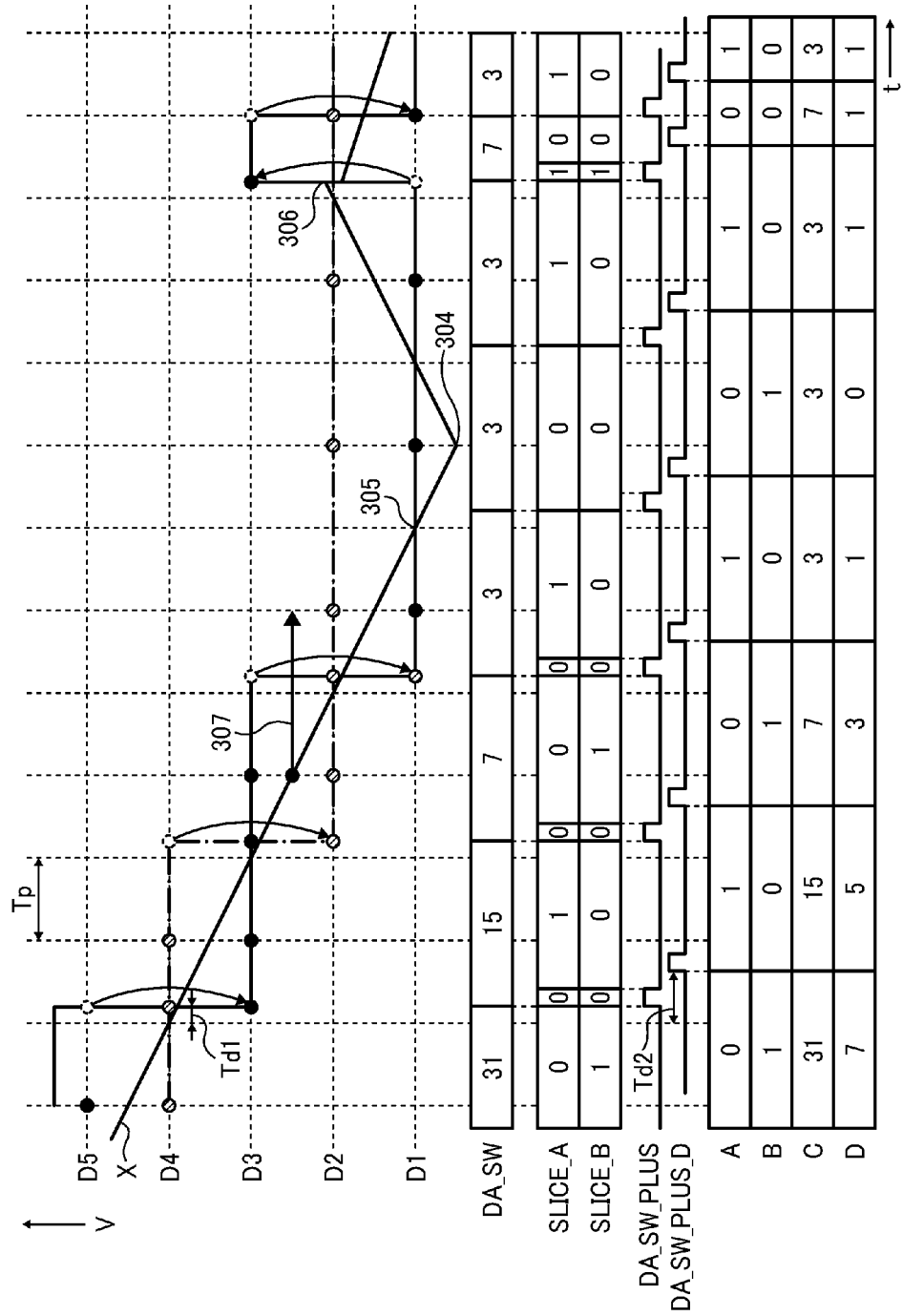

| No. | C [29:1] | A | B | D [29:1] | STATE |
|---|---|---|---|---|---|
| 1 | 0x0000_0003 | 0 | 0 | 0x0000_0000 | 301 |
| 2 | 0x0000_0003 | 1 | 0 | 0x0000_0001 | 302 |
| 3 | 0x0000_0003 | 1 | 1 | 0x0000_0003 | 303 |
| 4 | 0x0000_0006 | 0 | 0 | 0x0000_0001 | 301 |
| 5 | 0x0000_0006 | 0 | 1 | 0x0000_0003 | 302 |
| 6 | 0x0000_0006 | 1 | 1 | 0x0000_0007 | 303 |
| 7 | 0x0000_000C | 0 | 0 | 0x0000_0003 | 301 |
| 8 | 0x0000_000C | 1 | 0 | 0x0000_0007 | 302 |
| 9 | 0x0000_000C | 1 | 1 | 0x0000_000F | 303 |
| 10 | 0x0000_0018 | 0 | 0 | 0x0000_0007 | 301 |
| 11 | 0x0000_0018 | 0 | 1 | 0x0000_000F | 302 |
| 12 | 0x0000_0018 | 1 | 1 | 0x0000_001F | 303 |
| 13 | 0x0000_0030 | ... | ... | ... | ... |
| ... | ... | ... | ... | ... | ... |
| ... | ... | ... | ... | ... | ... |
| ... | ... | ... | ... | ... | ... |
| 82 | 0x1000_0000 | 0 | 0 | 0x07FF_FFFF | 301 |
| 83 | 0x1000_0000 | 0 | 1 | 0x0FFF_FFFF | 302 |
| 84 | 0x1000_0000 | 1 | 1 | 0x1FFF_FFFF | 303 |

FIG. 15

| PHASE INFORMATION SIGNAL | Hi | Low |
|---|---|---|
| U2 | U1 ≥ Ref | U1 < Ref |
| V2 | V1 ≥ Ref | V1 < Ref |
| W2 | W1 ≥ Ref | W1 < Ref |

FIG. 16

| PHASE INFORMATION SIGNAL | Hi | Low |
|---|---|---|
| U3 | U1 ≥ V1 | U1 < V1 |
| V3 | V1 ≥ W1 | V1 < W1 |
| W3 | W1 ≥ U1 | W1 < U1 |

FIG. 17

| PERIOD | INPUT CONDITION OF EACH SIGNAL | SELECTION SIGNAL | SIGNAL PHASE (DEGREE) |
|---|---|---|---|
| T1 | U3 = V3 = W3 = Low | W1 | 150 TO 210 |
| T2 | U3 = W3 = Low, V3 = Hi | V1 | −30 TO 30 |
| T3 | U3 = V3 = Hi, W3 = Low | U1 | 150 TO 210 |
| T4 | U3 = V3 = W3 = Hi | W1 | −30 TO 30 |
| T5 | U3 = W3 = Hi, V3 = Low | V1 | 150 TO 210 |
| T6 | U3 = V3 = Low, W3 = Hi | U1 | −30 TO 30 |

FIG. 18

| ELECTRICAL ANGLE | AMPLITUDE RATIO |
|---|---|
| −30 | −0.500 |
| −22.5 | −0.383 |
| −15 | −0.259 |
| −7.5 | −0.131 |
| 0 | 0 |
| 7.5 | 0.131 |
| 15 | 0.259 |
| 22.5 | 0.383 |
| 30 | 0.500 |

FIG. 19

| PHASE INFORMATION SIGNAL | Hi | Low |
|---|---|---|
| U2 | U1 ≥ U1− | U1 < U1− |
| V2 | V1 ≥ V1− | V1 < V1− |
| W2 | W1 ≥ W1− | W1 < W1− |

FIG. 20

| PERIOD | INPUT CONDITION OF EACH SIGNAL | SELECTION SIGNAL | SIGNAL PHASE (DEGREE) |
|---|---|---|---|
| T1 | U3 = V3 = W3 = Low, W2 = Hi | W1 | 150 TO 180 |
| T2 | U3 = V3 = W3 = Low, W2 = Low | W1− | 0 TO 30 |
| T3 | U3 = W3 = Low, V3 = Hi, V2 = Low | V1 | 150 TO 180 |
| T4 | U3 = W3 = Low, V3 = Hi, V2 = Hi | V1− | 0 TO 30 |
| T5 | U3 = V3 = Hi, W3 = Low, U2 = Hi | U1 | 150 TO 180 |
| T6 | U3 = V3 = Hi, W3 = Low, U2 = Low | U1− | 0 TO 30 |
| T7 | U3 = V3 = W3 = Hi, W2 = Low | W1− | 150 TO 180 |
| T8 | U3 = V3 = W3 = Hi, W2 = Hi | W1 | 0 TO 30 |
| T9 | U3 = W3 = Hi, V3 = Low, V2 = Hi | V1 | 150 TO 180 |
| T10 | U3 = W3 = Hi, V3 = Low, V2 = Low | V1− | 0 TO 30 |
| T11 | U3 = V3 = Low, W3 = Hi, U2 = Low | U1− | 150 TO 180 |
| T12 | U3 = V3 = Low, W3 = Hi, U2 = Hi | U1 | 0 TO 30 |

VOLTAGE LEVEL DETECTING DEVICE, MOTOR DRIVING APPARATUS, MOTOR DRIVING SYSTEM, AND METHOD FOR DETECTING VOLTAGE LEVEL

CROSS-REFERENCE TO RELATED APPLICATIONS

This patent application is based on and claims priority pursuant to 35 U.S.C. § 119(a) to Japanese Patent Application No. 2016-037767, filed on Feb. 29, 2016, in the Japan Patent Office, the entire disclosure of which is hereby incorporated by reference herein.

BACKGROUND

Technical Field

The present invention relates to a voltage level detecting device, a motor driving apparatus including the voltage level detecting device, a motor driving system including the voltage level detecting device, and a method for detecting a voltage level.

Description of the Related Art

There is a case where a mechanism is required for determining that continuous signals have reached a plurality of predetermined threshold voltage levels. For example, when a rotation position of a motor is controlled, such a mechanism determines that an input signal which changes according to a rotation phase of the motor has reached a threshold level provided for each predetermined phase, to detect a rotation phase of a rotor.

Specifically, as a method for detecting a rotation phase, one method is known in which a plurality of sensor signals (signals according to change of magnetic flux density) having a signal level according to the rotation position of the rotor of the motor is used to detect and output rotation phase information. In this method, the sensor signals are divided into a plurality of phase sections, and each divided sensor signal is compared with a threshold level provided for each predetermined phase, to detect that the sensor signal has reached the threshold level, thereby outputting a phase information signal indicating the detected phase.

SUMMARY

In accordance with some embodiments of the present invention, a voltage level detecting device is provided. The voltage level detecting device includes a plurality of comparators, a detection circuit, a trigger signal output circuit, a delayed control signal output circuit, a delayed comparison result signal output circuit, a circuit, and a control circuit. The plurality of comparators has a plurality of threshold levels different from each other based on a control signal, and compares a voltage level of an input signal to be changed with each threshold level to generate and output a comparison result signal indicating that the input signal has reached each threshold level. The detection circuit detects a change in the comparison result signal and outputs a detection signal. The trigger signal output circuit outputs a trigger signal when a predetermined time has elapsed after receiving the detection signal. The delayed control signal output circuit outputs a delayed control signal indicating a value of the control signal at the timing when the trigger signal has been received. The delayed comparison result signal output circuit outputs a delayed comparison result signal indicating the value of the comparison result signal at the timing when the trigger signal has been received. The circuit outputs a voltage level signal indicating a voltage level of the input signal based on the delayed control signal and the delayed comparison result signal. The control circuit outputs the control signal based on the voltage level signal and the comparison result signal.

In accordance with some embodiments of the present invention, the motor driving apparatus is provided. The motor driving apparatus includes the above level detecting device and an additional control circuit that drives and controls a motor based on a phase detecting information signal detected based on the voltage level signal.

In accordance with some embodiments of the present invention, a motor driving system is provided. The motor driving system includes the above motor driving apparatus and a motor to be driven and controlled by the additional control circuit.

In accordance with some embodiments of the present invention, a method for detecting a voltage level is provided. The method includes: comparing a voltage level of an input signal to be changed with each threshold level of a plurality of comparators having a plurality of threshold levels different from each other based on a control signal, to generate and output a comparison result signal indicating that the input signal has reached each threshold level; detecting a change in the comparison result signal to output a detection signal; outputting a trigger signal when a predetermined time has elapsed after receiving the detection signal; outputting a delayed control signal indicating a value of the control signal at the timing when the trigger signal has been received; outputting a delayed comparison result signal indicating the value of the comparison result signal at the timing when the trigger signal has been received; outputting a voltage level signal indicating a voltage level of the input signal based on the delayed control signal and the delayed comparison result signal; and outputting the control signal based on the voltage level signal and the comparison result signal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is a timing chart of an operation of the phase detecting circuit in FIG. 12;

FIG. 15 is a table of a comparison result signal relative to an input signal to a first phase detecting circuit in FIG. 3;

FIG. 16 is a table of a comparison result signal relative to an input signal to a second phase detecting circuit in FIG. 3;

FIG. 17 is a table of a first signal selection condition of a signal selection circuit in FIG. 3;

FIG. 18 is a table of a relation between an electrical angle and an amplitude ratio of a selection signal X from the signal selection circuit in FIG. 3;

FIG. 19 is a table of a comparison result signal relative to an input signal to a first phase detecting circuit in FIGS. 5A and 5B; and FIG. 20 is a table of a second signal selection condition of a signal selection circuit in FIGS. 5A and 5B.

Figure 1:
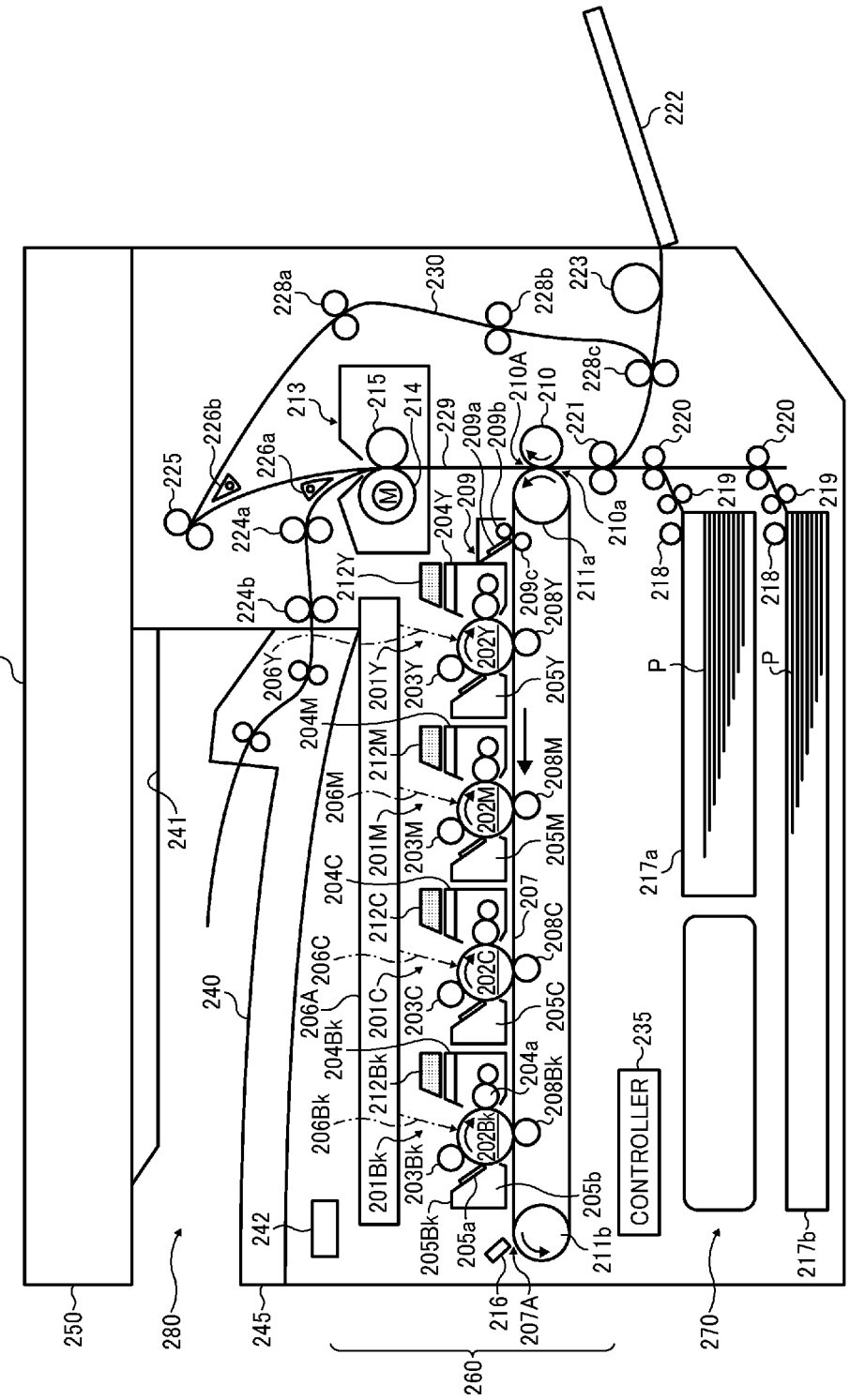
FIG. 1 is a schematic diagram of a general arrangement of an image forming apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments according to the present invention are described below referring to the drawings. The same component is denoted with the same reference numeral in the embodiments below.

A conventional voltage level detecting device had a disadvantage in that the voltage level detecting device causes a malfunction and the position becomes unknown when outputs of a plurality of comparators are changed in a short time interval, for example, in a case where a rotation speed of the motor becomes faster than a predetermined speed.

In view of this situation, a voltage detecting device is provided capable of accurately detecting a voltage level for detecting a phase with a simple configuration.

First Embodiment

FIG. 1 is a schematic diagram of a general arrangement of an image forming apparatus 200 according to a first embodiment of the present invention. The general arrangement of the image forming apparatus 200 is described referring to FIG. 1. The image forming apparatus 200 is a tandem-type intermediate transfer system image forming apparatus using an electrophotographic system and is a full color copying machine.

In FIG. 1, the image forming apparatus 200 includes an image reading unit 250, an image forming unit 260, a paper feeding unit 270, and a paper ejecting unit 280. The image reading unit 250 is disposed above an apparatus body 245 and has a function for reading an image of a document. The image forming unit 260 is disposed below the image reading unit 250. The image forming unit 260 has a function for forming an image on a paper sheet, as an example of a transfer material, based on image information (image data) read by the image reading unit 250 or transmitted from a personal computer that is an external device. The image forming unit 260 includes image forming devices. The paper feeding unit 270 is disposed at the lowest portion of the apparatus body 245 and has a function for supplying a paper sheet to a paper sheet conveyance path. The paper ejecting unit 280 is provided above the image forming unit 260 and has a function for ejecting the paper sheet on which the image has been formed.

The image reading unit 250 includes a contact glass, a light source, an image forming lens, an image sensor, and a plurality of mirrors.

The image forming unit 260 includes four image forming units 201Y, 201M, 201C, and 201Bk arranged from right to left in FIG. 1. The four image forming units 201Y, 201M, 201C, and 201Bk respectively correspond to four toner colors, i.e., yellow (Y), cyan (C), magenta (M) that are three primary colors of color materials, and black (Bk) that is an achromatic color. Each of the image forming units 201Y, 201M, 201C, and 201Bk functions as an image forming device and includes a combination of a plurality of components.

The four image forming units 201Y, 201M, 201C, and 201Bk have a common internal structure except for containing different color toners. Therefore, an outline of the image forming unit 201Bk is described below as a representative to simplify the description. Regarding the other image forming units, the reference Bk attached to each member of the image forming unit 201Bk is replaced with the reference Y for the image forming unit 201Y, the reference M for the image forming unit 201M, and the reference C for the image forming unit 201C, and the descriptions on the other image forming units are omitted.

An optical writing unit 206A is disposed above the four image forming units 201Y, 201M, 201C, and 201Bk. The optical writing unit 206A writes a latent image to each photoconductor drum to be described. The image forming unit 260 includes a transfer unit 207A that transfers toner images formed by the image forming units 201Y, 201M, 201C, and 201Bk onto an intermediate transfer belt 207 serving as an intermediate transfer body. The image forming unit 260 includes a secondary transfer unit 210A that collectively transfers the toner images on the intermediate transfer belt 207 onto the paper sheet. The order of colors Y, M, C, and Bk is not limited to the arrangement illustrated in FIG. 1 and may be another order. Each of the image forming units 201Y, 201M, 201C, and 201Bk may be a process cartridge that is attachable to and detachable from the apparatus body 245.

The image forming unit 201Bk includes a photoconductor drum 202Bk serving as an image bearer, a charging roller 203Bk, a developing device 204Bk, and a cleaning device 205Bk. The charging roller 203Bk has a function as a charging device that uniformly charges an outer surface of the photoconductor drum 202Bk. An exposure 206Bk is a laser beam to form an electrostatic latent image on the outer surface of the photoconductor drum 202Bk that has been uniformly charged. The developing device 204Bk has a function as a developer that visualizes the electrostatic latent image formed on the photoconductor drum 202Bk by the optical writing unit 206A to a monochromatic toner image by using the toners of the corresponding colors. The cleaning device 205Bk has a function as a cleaner that cleans and collects residual toner remaining on the outer surface of the photoconductor drum 202Bk after transfer.

The photoconductor drum 202Bk is rotary-driven clockwise in FIG. 1 by a drum driving motor serving as a driver. The image forming units 201Y, 201M, 201C, and 201Bk are arranged in order at a predetermined pitch along a moving direction of the intermediate transfer belt 207 indicated by an arrow in FIG. 1 with rotation axes of the photoconductor drums 202Y, 202M, 202C, and 202Bk being in parallel to each other.

The optical writing unit 206A includes a light source such as a laser diode, a rotating polygon mirror for scanning, a polygon motor, and a scanning optical system such as a scanning lens (fθ lens). The optical writing unit 206A scans and irradiates the outer surfaces of the photoconductor drums 202Y, 202M, 202C, and 202Bk with a laser beam to perform exposure based on image information input from the image reading unit 250, a personal computer, or an external scanner. Accordingly, an electrostatic latent image corresponding to each color is formed on each of the photoconductor drums 202Y, 202M, 202C, and 202Bk.

The developing device 204Bk is a two-component developing system developing device. The developing device 204Bk includes a developer container that stores a developer including a black toner and a magnetic carrier. The developing device 204Bk includes a developing roller 204a, a screw that conveys and stirs the developer, and a toner concentration sensor. The developing roller 204a is disposed opposed to the photoconductor drum 202Bk and attaches the charged toner to the photoconductor drum 202Bk. The developing roller 204a includes a rotatable sleeve on the outer side and a magnet secured to the inner side. A toner replenishing container 212Bk is disposed above the developing device 204Bk. The toner replenishing container 212Bk communicates with the developing device 204Bk to store the exchangeable toner and to supply the toner into the developing device 204Bk. The toner replenishing container 212Bk replenishes the toner in response to an output of the toner concentration sensor. Here, the toner replenishing container 212Bk directly conveys the toner into the developer container. However, the toner replenishing container 212Bk may include a replenishing path in the device body to replenish the toner into the developer container.

The cleaning device 205Bk includes a cleaning blade 205a that scrapes and removes residual toner and foreign substances attached to the outer surface of the photoconductor drum 202Bk. The cleaning device 205Bk further includes a storage container 205b that stores the removed residual toner and foreign substances. The residual toner and foreign substances removed by the cleaning blade 205a and stored in the storage container 205b are conveyed by a conveyance coil and a screw disposed in the storage container 205b to be stored in a waste toner storing unit.

Figure 2:
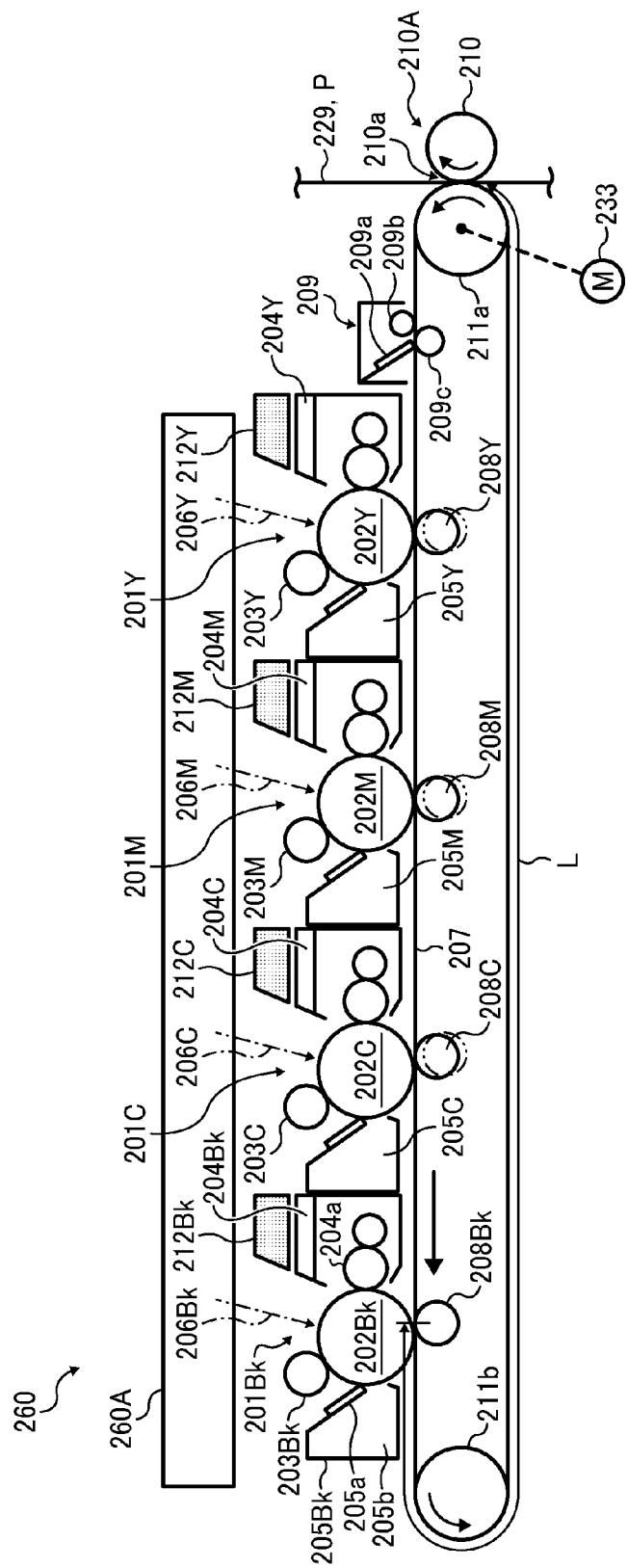
FIG. 2 is a schematic view of an enlarged image forming unit in FIG. 1.

The transfer unit 207A is an intermediate-transfer-system transfer device including the intermediate transfer belt 207, two support rollers 211a and 211b, four primary transfer rollers 208Y, 208C, 208M, and 208Bk, and a secondary transfer roller 210. The intermediate transfer belt 207 is disposed opposed to the photoconductor drums 202Y, 202M, 202C, and 202Bk. The intermediate transfer belt 207 is moved in a direction indicated by arrow in FIG. 1 by a belt driving motor 233 illustrated in FIG. 2, serving as an intermediate transfer body drive unit to be described later. The intermediate transfer belt 207 is formed of an endless belt serving as an intermediate transfer body. The toner images formed on the photoconductor drums 202Y, 202M, 202C, and 202Bk are transferred onto the intermediate transfer belt 207 in an overlapping manner and conveyed thereby.

The two support rollers 211a and 211b support and stretch the intermediate transfer belt 207 (bridge the belt in tension-applied state) in a travelable and rotatable manner. The support roller 211a is a driving roller coupled to the belt driving motor 233 illustrated in FIG. 2. The support roller 211a rotary-drives the intermediate transfer belt 207 in a direction indicated by arrow in FIG. 2. The support roller 211b is a driven roller. The secondary transfer roller 210 is disposed at a position opposed to the support roller 211a across the intermediate transfer belt 207. The secondary transfer unit 210A indicates a device portion of the secondary transfer roller 210 disposed at a position opposed to the support roller 211a, that is a driving roller, across the intermediate transfer belt 207.

A belt cleaning device 209 is disposed above the intermediate transfer belt 207 near the support roller 211a. The belt cleaning device 209 removes a residual toner component, an external additive component, or foreign substances attached to the outer surface of the intermediate transfer belt 207. The belt cleaning device 209 includes a cleaning blade 209a disposed in contact with the intermediate transfer belt 207 so as to face in the direction of movement of the intermediate transfer belt 207. The belt cleaning device 209 also includes a metal cleaning counter roller 209c disposed opposed to the cleaning blade 209a across the intermediate transfer belt 207. The residual toner component and the like removed by the cleaning blade 209a is conveyed by a conveyance coil 209b and stored in the waste toner storing unit.

The primary transfer rollers 208Y, 208C, 208M, and 208Bk function as primary transfer units that respectively transfer the toner images from the photoconductor drums 202Y, 202M, 202C, and 202Bk onto the intermediate transfer belt 207. The four primary transfer rollers 208Y, 208C, 208M, and 208Bk are respectively disposed opposed to the photoconductor drums 202Y, 202M, 202C, and 202Bk across the intermediate transfer belt 207 to form respective primary transfer nips serving as primary transfer units. The primary transfer rollers 208Y, 208C, 208M, and 208Bk each function as a contact transfer bias (transfer voltage) applying device and are coupled to a bias power source. The primary transfer rollers 208Y, 208C, 208M, and 208Bk can apply a primary transfer bias to the rear surface (inner surface) of the intermediate transfer belt 207. The secondary transfer roller 210 is a driven roller energized by an energization unit to be pressed against the intermediate transfer belt 207 at the circumference of the support roller 211a, thus forming a secondary transfer nip between the intermediate transfer belt 207 and the secondary transfer roller 210. The secondary transfer roller 210 is a secondary transfer bias applying device to which a transfer bias having a polarity reverse to a polarity of the toner image to be transferred is applied. In this way, the secondary transfer roller 210, forming the secondary transfer nip with the intermediate transfer belt 207 therebetween, provides a secondary transfer unit 210a that collectively transfers the toner images on the intermediate transfer belt 207 onto the paper sheet. An image density sensor 216 is disposed near the intermediate transfer belt 207 above the support roller 211b. The image density sensor 216 measures the amount and position of each color toner transferred onto the intermediate transfer belt 207. The measured values are used for adjustment of image density and for positioning. The image density sensor 216 is of a combination of regular reflection and diffuse reflection.

A fixing unit 213 that heats a paper sheet P conveyed through a normal conveyance path 229 is disposed above the secondary transfer unit 210A. The fixing unit 213 includes a fixing roller 214 and a pressurizing roller 215 that is opposed to and pressed against the fixing roller 214. A heat source, such as a halogen heater, is disposed in the fixing roller 214, and power is supplied from a power source to the halogen heater so that the temperature of the outer surface of the fixing roller 214 becomes a predetermined temperature. Heat and pressure are applied from the fixing roller 214 to the toner image on the paper sheet P in a fixing nip unit that is a pressing part between the fixing roller 214 and the pressurizing roller 215 so that the toner image is melted and fixed to the paper sheet P. The paper sheet P is conveyed from the fixing nip unit to a pair of conveying rollers.

The paper feeding unit 270 includes: paper feeding cassettes 217a and 217b that store the paper sheets P and are drawable from the apparatus body 245; a paper feeding roller 218 that presses the stored paper sheet P from above at a predetermined pressure to feed the paper sheet P; and a separation roller 219 that separates the fed paper sheet P one by one. A controller 235 controls a driving unit of the paper feeding unit 270 based on a signal instructed by an operation unit so that the paper feeding rollers 218 feed the paper sheets P stored in the paper feeding cassettes 217a and 217b to the normal conveyance path 229. The paper feeding cassettes 217a and 217b respectively store paper sheets P having different sizes in the width direction that is perpendicular to the direction of conveyance of the sheet P. Hereinafter, for example, the description is made as assuming that A5 paper sheets P are stored in the paper feeding cassette 217a and A4 paper sheets P are stored in the paper feeding cassette 217b. The paper feeding unit 270 includes: a manual feed tray 222 on which a paper sheet to be fed, having an optional size within a predetermined range, is placed; and a paper feeding roller 223 that feeds the paper sheet. The paper feeding unit 270 rotary-drives the paper feeding roller 223 to feed the paper sheet placed on the manual feed tray 222 to the normal conveyance path 229.

The paper ejecting unit 280 includes a first paper ejecting tray 240 and a pair of paper ejecting rollers 224a and 224b. The first paper ejecting tray 240 is formed on an inclined plane of the apparatus body 245 disposed below a paper ejecting space formed between the optical writing unit 206A and the image reading unit 250. The pair of paper ejecting rollers 224a and 224b ejects the paper sheet, which has passed through the fixing unit 213, from the normal conveyance path 229 to the first paper ejecting tray 240. A second paper ejecting tray 241 and a pair of paper ejecting rollers 225 are disposed near and above the first paper ejecting tray 240. The second paper ejecting tray 241 ejects the paper sheet on which an image has been formed by receiving a facsimile and is also used as a switchback conveying path to invert the paper sheet. The pair of paper ejecting rollers 225 ejects the paper sheet to the second paper ejecting tray 241 for ejecting the paper sheet. The pair of paper ejecting rollers 225 includes a driving roller and a driven roller and inverts a first surface of the paper sheet. The pair of paper ejecting rollers 225 is rotatable in both forward and reverse directions and is rotary-driven by a motor that is rotatable in both forward and reverse directions.

A switching claw 226a is disposed in a branch between the normal conveyance path 229 and a paper ejecting path that is branched from the normal conveyance path 229 and extended to the pair of paper ejecting rollers 224a and 224b. Also, a switching claw 226b is disposed above the switching claw 226a, at a junction of the normal conveyance path 229 with a double-sided conveyance path 230. The rocking positions of each top ends of the switching claws 226a and 226b can be switched at a predetermined timing according to a printing mode, i.e., a one-sided printing mode or a double-sided printing mode, by a combination of a spring as an energization unit with a solenoid as a driving unit.

The apparatus body 245 includes the controller 235 that controls the image forming apparatus 200 and a temperature and humidity sensor 242 that detects the temperature and the relative humidity.

Next, conveyance paths and transfer devices for the paper sheet are described. The conveyance paths include the normal conveyance path 229 and the double-sided conveyance path 230. The normal conveyance path 229 is a vertical-conveyance-type (vertical-path-type) conveyance path that conveys the paper sheets from the paper feeding unit 270, disposed at a lower part of the apparatus body 245, to the paper ejecting unit 280, disposed at an upper part of the apparatus body 245, in an upward direction. The double-sided conveyance path 230 inverts the paper sheet for double-sided printing. The conveyance paths 229 and 230 can be switched by the switching claw 226b. The paper sheet, that has been guided to the double-sided conveyance path 230 by the switching claw 226b and conveyed to above the second paper ejecting tray 241 by the pair of paper ejecting rollers 225, is inverted in a switchback manner as the pair of ejecting rollers 225 is rotated reversely.

Subsequently, the paper sheet is conveyed to the normal conveyance path 229 upstream from a pair of registration rollers 221 via the double-sided conveyance path 230.

A plurality of pairs of conveying rollers 220, 228a, 228b, and 228c is disposed on the normal conveyance path 229 and the double-sided conveyance path 230 at intervals according to the minimum paper sheet size. These pairs of conveying rollers rotate to convey the paper sheet while sandwiching the paper sheet between the conveying rollers. The pair of registration rollers 221 is provided below the secondary transfer unit 210a (secondary transfer nip) on the normal conveyance path 229. The pair of registration rollers 221 adjusts a timing to convey the paper sheet to the secondary transfer unit 210a based on a command from a controller.

Figure 3:
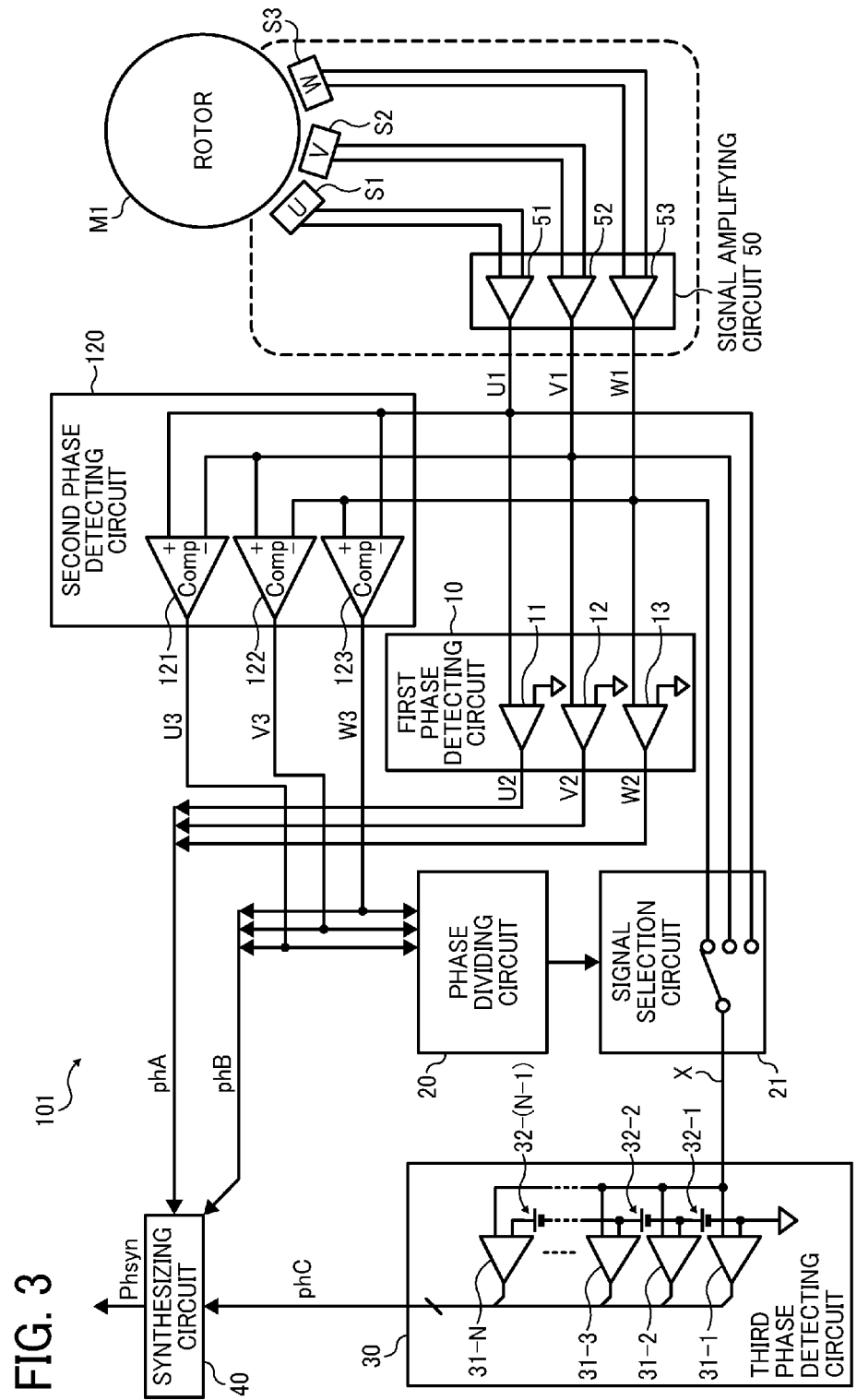
FIG. 3 is a block diagram of a structure of a motor driving apparatus for the image forming apparatus in FIG. 1.

FIG. 3 is a block diagram of a structure of a motor driving apparatus 101 for the image forming apparatus 200 in FIG. 1. In FIG. 3, the motor driving apparatus 101 detects and outputs phase information of a motor M1 based on sensor signals U1, V1, and W1. The sensor signals U1, V1, and W1 are obtained as a signal amplifying circuit 50 in a sensor integrated circuit (IC) amplifies differential sensor signals (U1, U1-; V1, V1-; and W1, W1-) from magnetic sensors S1 to S3 (U-phase, V-phase, and W-phase) (referred to as sensor below) disposed around a rotor of the motor M1 to detect an angle of rotation. The motor driving apparatus 101 includes a first phase detecting circuit 10, a second phase detecting circuit 120, a phase dividing circuit 20, a signal selection circuit 21, a third phase detecting circuit 30, and a signal synthesizing circuit 40.

In FIG. 3, the differential sensor signals (U1, U1-; V1, V1-; and W1, W1-) from the sensors S1 to S3 (U-phase, V-phase, and W-phase) are amplified by the signal amplifying circuit 50 including three amplifiers 51 to 53 and converted into single-ended signals. The converted signals are input to the first phase detecting circuit 10, the second phase detecting circuit 120, and the signal selection circuit 21. FIG. 15 is a table of a comparison result signal relative to the input signal to the first phase detecting circuit 10 in FIG. 3. The first phase detecting circuit 10 includes three comparators 11 to 13. As illustrated in FIG. 15, the comparators 11 to 13 of the first phase detecting circuit 10 compare the amplitudes of the input differential sensor signals with a reference level Ref and respectively generate comparison result signals U2, V2, and W2 having a Hi level or a Low level. Then, the comparators 11 to 13 output the comparison result signals U2, V2, and W2 to the signal synthesizing circuit 40. Here, the comparison result signals U2, V2, and W2 from the first phase detecting circuit 10 become first phase information signals phA respectively having predetermined phases.

The second phase detecting circuit 120 includes three comparators 121 to 123. As illustrated in FIG. 16, the comparators 121 to 123 generate comparison result signals U3, V3, and W3 indicating a comparison result of two values and output the signals to the phase dividing circuit 20 and the signal synthesizing circuit 40. Here, the comparison result signals U3, V3, and W3 from the second phase detecting circuit 120 become second phase information signals phB respectively having predetermined phases.

The phase dividing circuit 20 generates a signal selection signal that has been divided into a section having a predetermined phase section based on the comparison result signals U3, V3, and W3 and outputs the signal selection signal to the signal selection circuit 21. Here, the sensor signals U1, V1, and W1 are also input to the signal selection circuit 21, and the signal selection circuit 21 selects an appropriate signal based on the signal selection signal from the phase dividing circuit 20 and outputs the selected signal to the third phase detecting circuit 30 as a selection signal X.

In addition, the third phase detecting circuit 30 primarily includes N−1 voltage sources 32-1 to 32-(N−1) and N phase detectors 31-1 to 31-N. The third phase detecting circuit 30 compares the selection signal X with a plurality of threshold levels generated by the N−1 voltage sources 32-1 to 32-(N−1) and outputs a third phase information signal phC, indicating that the motor M1 has been rotated at a predetermined angle, to the signal synthesizing circuit 40. Subsequently, the signal synthesizing circuit 40 synthesizes the phase information signal phC with the first phase information signal phA and outputs the synthesized second phase information signal phB. The threshold levels are previously set according to signal amplitudes of the rotation angle sensors S1 to S3.

Figure 4:
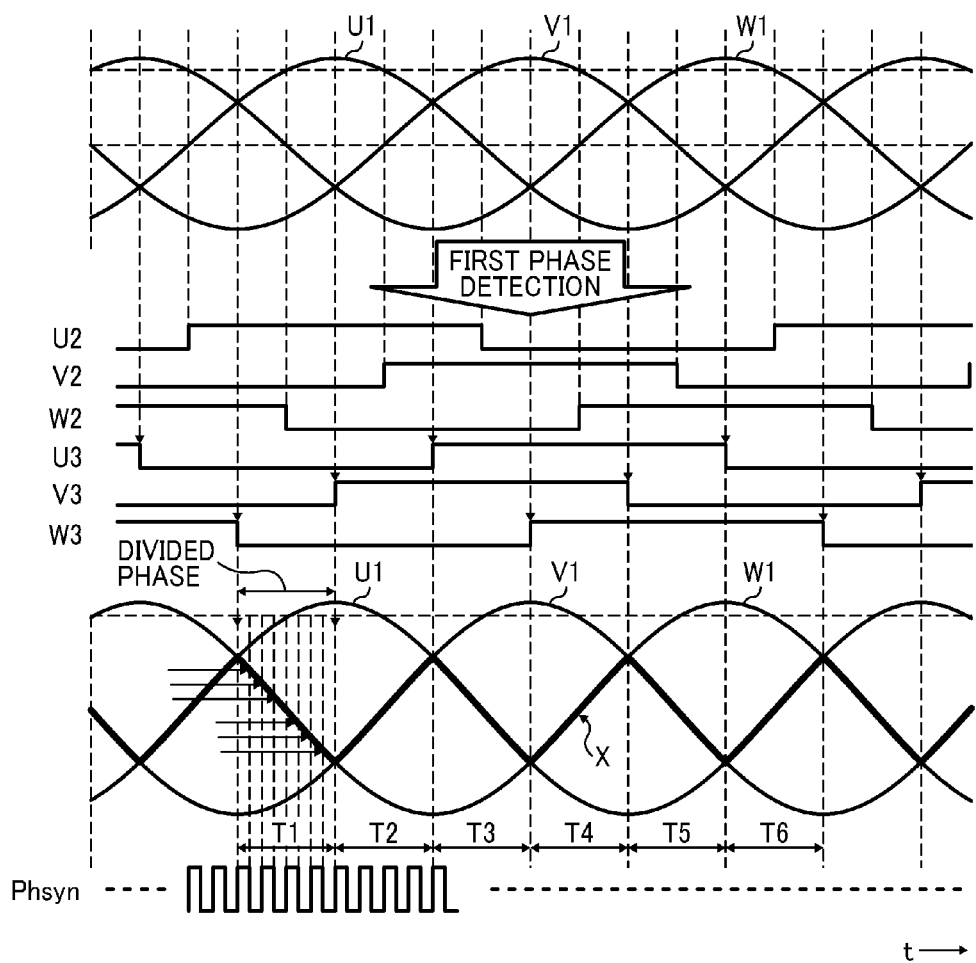
FIG. 4 is a timing chart of signals indicating operation states of the motor driving apparatus in FIG. 3.

FIG. 4 is a timing chart of signals indicating operation states of the motor driving apparatus 101 in FIG. 3. In FIG. 4, the non-inverted signals U1, V1, and W1 of the differential sensor signals from the sensors S1 to S3 are indicated by sine waves (instead of this, waveforms substantially similar to the sine wave may be used). The sensors S1 to S3 are arranged at intervals of 120 degrees of the electrical angle, and the inversion signals U1-, V1-, and W1- of the differential sensor signals form opposite phases of the respective sine waves.

The first phase detecting circuit 10 is used to obtain the comparison result signals U2, V2, and W2 as a result of the comparison of the differential sensor signals (U1, U1-; V1, V1-; and W1, W1-) with the respective amplitude center level (common level). Also, the second phase detecting circuit 120 is used to obtain the comparison result signals U3, V3, and W3 as a comparison result of the sensor signals U1, V1, and W1 as illustrated in FIG. 16.

In addition, the phase dividing circuit 20 divides a phase into sections between switching edges of each comparison result signals U3, V3, and W3. For example, in FIG. 4, the phase dividing circuit 20 selectively switches and obtains the selection signal X in each divided phase section based on a table illustrated FIG. 17. In FIG. 4, each selection signal X is indicated by a thick line in the lower part of FIG. 4. Each selection signal X is divided into sections of 60 degrees having high linearity, ranging from −30° to 30° or from 150° to 210° in terms of sine wave phase. That is, the divided phase section corresponds to the electrical angle of 60 degrees. In addition, horizontal arrows attached to the selection signal X in FIG. 4 indicate the predetermined threshold levels. When the selection signal X reaches the predetermined threshold level, a pulse edge is output. For example, when a section between an electrical angle −30° and an electrical angle 30° of the selection signal X is divided into eight sections by 7.5°, a relation between the amplitude and the electrical angle is as indicated in FIG. 18. Here, it is assumed that the common level of the selected sensor signal be zero and the amplitude of the electrical angle 90° be one. As illustrated in FIG. 18, a predetermined threshold level is determined based on the ratio of the selection signal X relative to the sine wave amplitude. When the electrical angle is −30° and 30°, the second phase information signal phB is available. When the electrical angle is 0°, the first phase information signal phA is available. Therefore, the above electrical angles are not necessarily used as the predetermined threshold level of the third phase detecting circuit 30.

Figure 5A:
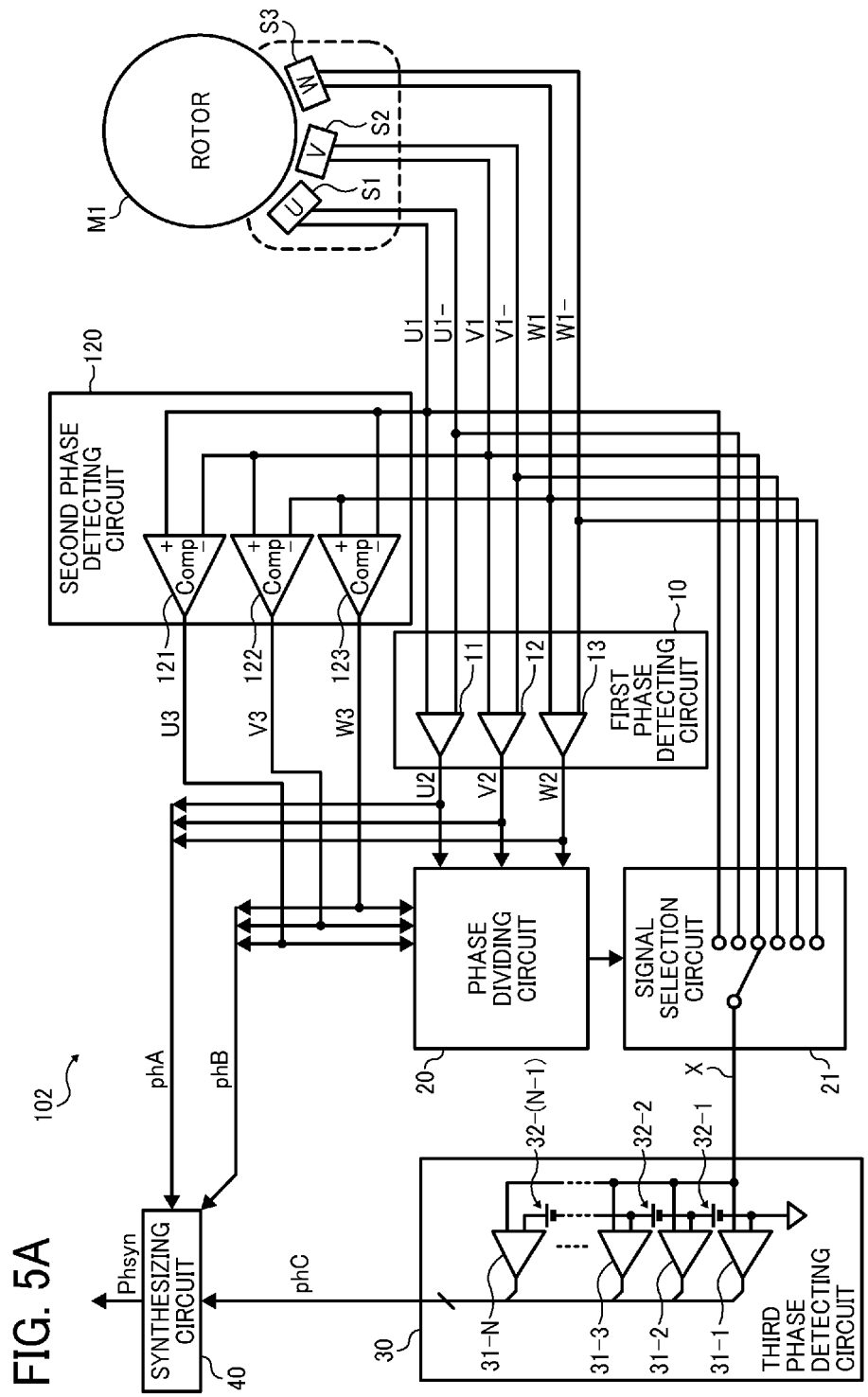
FIG. 5A is a block diagram of a structure of a motor driving apparatus according to a second embodiment of the present invention.
Figure 5B:
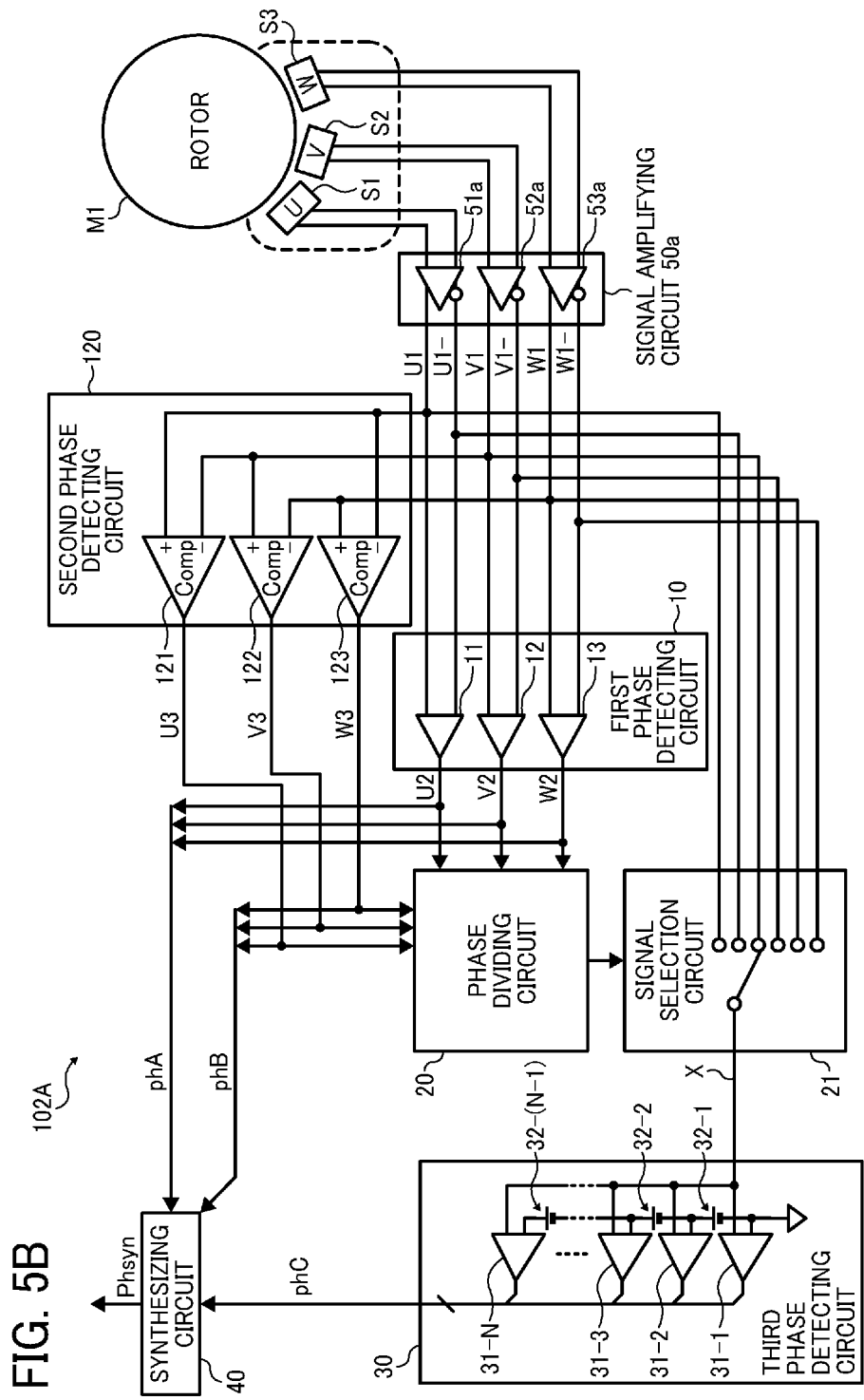
FIG. 5B is a block diagram of a structure of a motor driving apparatus according to a modification of the second embodiment of the present invention.
Figure 7A:
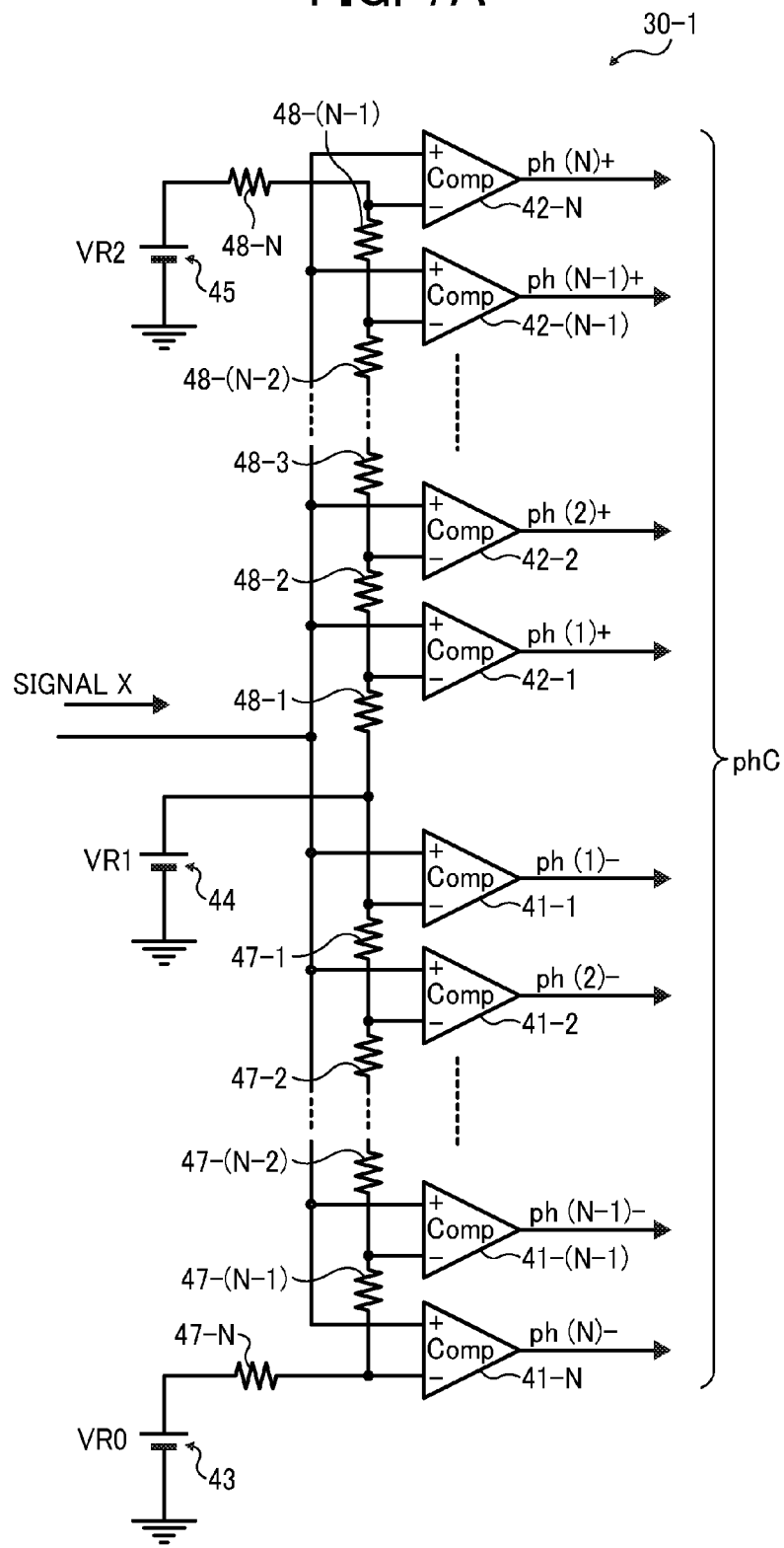
FIG. 7A is a circuit diagram of a structure of a phase detecting circuit according to an example 1 of a third phase detecting circuit in FIGS. 3, 5A, and 5B.

FIG. 7A is a circuit diagram of a structure of a phase detecting circuit 30-1 according to an example 1 of the third phase detecting circuit 30 in FIGS. 3, 5A, and 5B. In FIG. 7A, the phase detecting circuit 30-1 includes three voltage sources 43 to 45, 2N resistances 47-N to 47-1 and 48-1 to 48-N coupled to each other in series, and 2N comparators 41-N to 41-1 and 42-1 to 42-N. The phase detecting circuit 30-1 compares the signal amplitude of the selection signal X with a plurality of threshold levels to generate and output a phase detecting signal phC (ph (N)− to ph (1)− and ph (1)+ to ph (N)+). In FIG. 7A, a voltage VR1 level of the voltage source 44 is an amplitude center (common) level of the sine wave. A voltage VR2 level and a voltage VR0 level of the voltage sources 45 and 43 respectively correspond to the upper limit level and the lower limit level of the sine wave amplitude. A level at which the voltage is divided at an amplitude ratio interval according to the electrical angle with the voltage VR1 level as the center is compares with the selection signal X. The selection signal X simply increases or decreases so that the phase detecting signal phC is switched to be output in order.

Subsequently, the signal synthesizing circuit 40 synthesizes the first phase information signal phA, the second phase information signal phB, and the third phase information signal phC to generate at least one digital signal and output the digital signal as a motor control signal.

As described above, according to the present embodiment, with the signal which is output each time when the selection signal X reaches the amplitude level according to the electrical angle, the phase data more than the number of the phase information signals obtained by the first phase information signal phA can be obtained. In FIG. 18, a method for obtaining the phase information by the electrical angle of 7.5° is illustrated as an example. As another example, when the amplitude ratio is divided by the electrical angle of 6°, the phase information twice as much as the phase information of a case of the electrical angle of 6° is obtained, and when the amplitude ratio is divided by the electrical angle of 3°, the phase information of two and half times of a case of the electrical angle of 7.5° is obtained.

In FIG. 4, the selection signal X exists in the section between the sine wave of −30° and 30° of each sensor signal or the section between 150° and 210°. Even when the phase section is switched and the selected sensor signal is changed, the selection signal X is continuously kept. Since a signal next to the third phase information signal phC which is the comparison result signal from the third phase detecting circuit 30 illustrated in FIG. 7A is switched in order, the final synthesis signal can form a gray code.

Second Embodiment

FIG. 5A is a block diagram of a structure of a motor driving apparatus 102 for an image forming apparatus 200 in FIG. 1 according to a second embodiment of the present invention. The motor driving apparatus 102 according to the second embodiment is different from the motor driving apparatus 101 according to the first embodiment in that a signal amplifying circuit 50 is not provided. That is, a sensor signal remains as a differential signal, not a single-ended signal, and differential sensor signals (U1, U1-; V1, V1-; and W1, W1-) from sensors S1 to S3 (U-phase, V-phase, and W-phase) are output and are respectively input to a first phase detecting circuit 10, a second phase detecting circuit 120, and a signal selection circuit 21. Here, in the first phase detecting circuit 10, the sensor signals U1 and U1- are input to a comparator 11, and the sensor signals V1 and V1- are input to a comparator 12, and the sensor signals W1 and W1- are input to a comparator 13. Then, phases of the sensor signals are detected. In the second phase detecting circuit 120, a comparison result of the sensor signals are obtained. Therefore, it is not necessary to input the differential signal, and a one-side signal of each differential sensor signal may be input.

FIG. 5B is a block diagram of a structure of a motor driving apparatus 102A for the image forming apparatus 200 in FIG. 1 according to a modification of the second embodiment of the present invention. The motor driving apparatus 102A according to the modification of the second embodiment is different from the motor driving apparatus 102 according to the second embodiment in that the motor driving apparatus 102A includes a signal amplifying circuit 50a including amplifiers 51a, 52a, and 53a having input and output signals which are differential signals at output ends of the sensors S1 to S3. The differential sensor signals (U1, U1-; V1, V1-; and W1, W1-) from the sensors S1 to S3 (U-phase, V-phase, and W-phase) are once amplified by the signal amplifying circuit 50a to obtain the differential sensor signals (U1, U1-; V1, V1-; and W1, W1-). Then, the differential sensor signals (U1, U1-; V1, V1-; and W1, W1-) are respectively input to the first phase detecting circuit 10, the second phase detecting circuit 120, and the signal selection circuit 21. Although the second embodiment and the modification have the same effect, the signal amplifying circuit 50a is easily used in a point that the signal amplifying circuit 50a uniformizes the sensor signals.

Here, a role of the signal amplifying circuit 50a is described below. The common level and amplitude level of the differential sensor signals from the sensors S1 to S3 (U-phase, V-phase, and W-phase) are often not uniformed. Also, the amplitude level is often electrically very small. When the levels are uniformed and the amplitude is larger, the output signal which has aimed a predetermined rotation angle from the third phase detecting circuit 30 indicates a value closer to the actual rotation angle of a rotor. That is, the purpose is to adjust the common level and to adjust and amplify the amplitude level by the signal amplifying circuit 50a when the differential sensor signals from the sensors S1 to S3 are not uniform.

Therefore, an operation of the modification of the second embodiment in FIG. 5B which is easily used is mainly described below. As described above, the amplified differential sensor signals (U1, U1-; V1, V1-; and W1, W1-) have been input to the first phase detecting circuit 10, the second phase detecting circuit 120, and the signal selection circuit 21. As illustrated in FIG. 19, for example, the first phase detecting circuit 10 outputs comparison result signals U2, V2, and W2 having a high level or a low level according to an input condition. The comparison result signals U2, V2, and W2 from the first phase detecting circuit 10 become first phase information signals phA which respectively have predetermined phases to be output to a signal synthesizing circuit 40. Also, the second phase detecting circuit 120 outputs the input sensor signals U1, V1, and W1 as the comparison result signals U3, V3, and W3 having two values, for example, as illustrated in FIG. 16. The comparison result signals U3, V3, and W3 from the second phase detecting circuit 120 become second phase information signals phB respectively having predetermined phases.

The comparison result signals U2, V2, and W2 and the comparison result signals U3, V3, and W3 are also input to the phase dividing circuit 20. The phase dividing circuit 20 outputs a signal obtained by dividing each input signal into sections having predetermined phase sections to the signal selection circuit 21. The differential sensor signals U1, U1-, V1, V1-, W1, and W1- are also input to the signal selection circuit 21. A predetermined appropriate signal is selected based on an output signal from the phase dividing circuit 20 as described in detail below. Subsequently, the selection signal X from the signal selection circuit 21 is input to the third phase detecting circuit 30, and the selection signal X reaches a predetermined threshold level in the third phase detecting circuit 30. Accordingly, a plurality of phase detecting signals output as phase information for informing that the motor has rotated at a predetermined angle is output to the signal synthesizing circuit 40 as the third phase information signal phC. The signal synthesizing circuit 40 synthesizes the first phase information signal phA, the second phase information signal phB, and the third phase information signal phC to obtain a synthesized phase information signal Phsyn having more phase information than the first phase information signal phA and use the above signal as a motor drive controlling signal. Here, the predetermined threshold level indicates a level according to a signal amplitude of each of the rotation angle sensors S1 to S3, and the predetermined threshold level is previously set.

Figure 6:
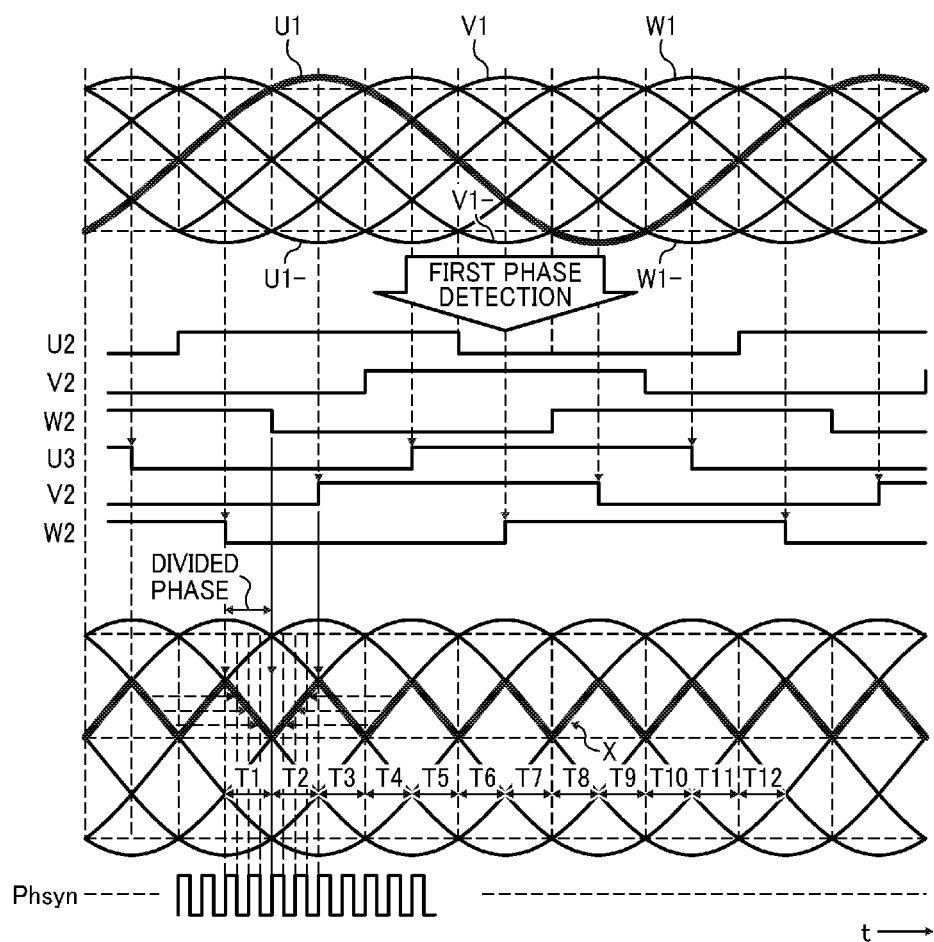
FIG. 6 is a timing chart of signals indicating operation states of the motor driving apparatuses in FIGS. 5A and 5B.

FIG. 6 is a timing chart of signals indicating operation states of the motor driving apparatuses 102 and 102A in FIGS. 5A and 5B. The differential sensor signals (U1, U1-; V1, V1-; and W1, W1-) are signals from the sensors S1 to S3 arranged around the rotor of the motor M1 at electrical angle 120° intervals. Each signal is output as having a phase which is 120° different from the sine wave according to the magnetic flux density of the rotor. Here, in the first phase detecting circuit 10, (1) the comparison result signal U2 is obtained as a comparison result of the sensor signals U1 and U1-, (2) the comparison result signal V2 is obtained as a comparison result of the sensor signals V1 and V1-, and (3) the comparison result signal W2 is obtained as a comparison result of the sensor signals W1 and W1-. In addition, the second phase detecting circuit 120 compares the signals as illustrated in FIG. 16 based on the sensor signals U1, V1, and W1 to obtain the comparison result signals U3, V3, and W3. The second phase detecting circuit 120 can obtain the similar comparison result signals U3, V3, and W3 with comparison based on the sensor signals U1-, V1-, and W1-. The second phase detecting circuit 120 divides a phase in a section between a switching edge and an edge of each comparison result signals U2, V2, and W2 and comparison result signals U3, V3, and W3. In the predetermined phase dividing section, the second phase detecting circuit 120 selectively switches the selection signal X according to the input condition in FIG. 20 and generates it, for example, in FIG. 7A. Therefore, the continuous selection signal X can be obtained at a dividing section boundary when the dividing phase is 30 degrees of the electrical angle. In a section between 150 and 180 degrees and a section between zero and 30 degrees of the sine wave, the linearity is very high, and the third phase detecting circuit 30 advantageously detects the phase level.

Figure 7B:
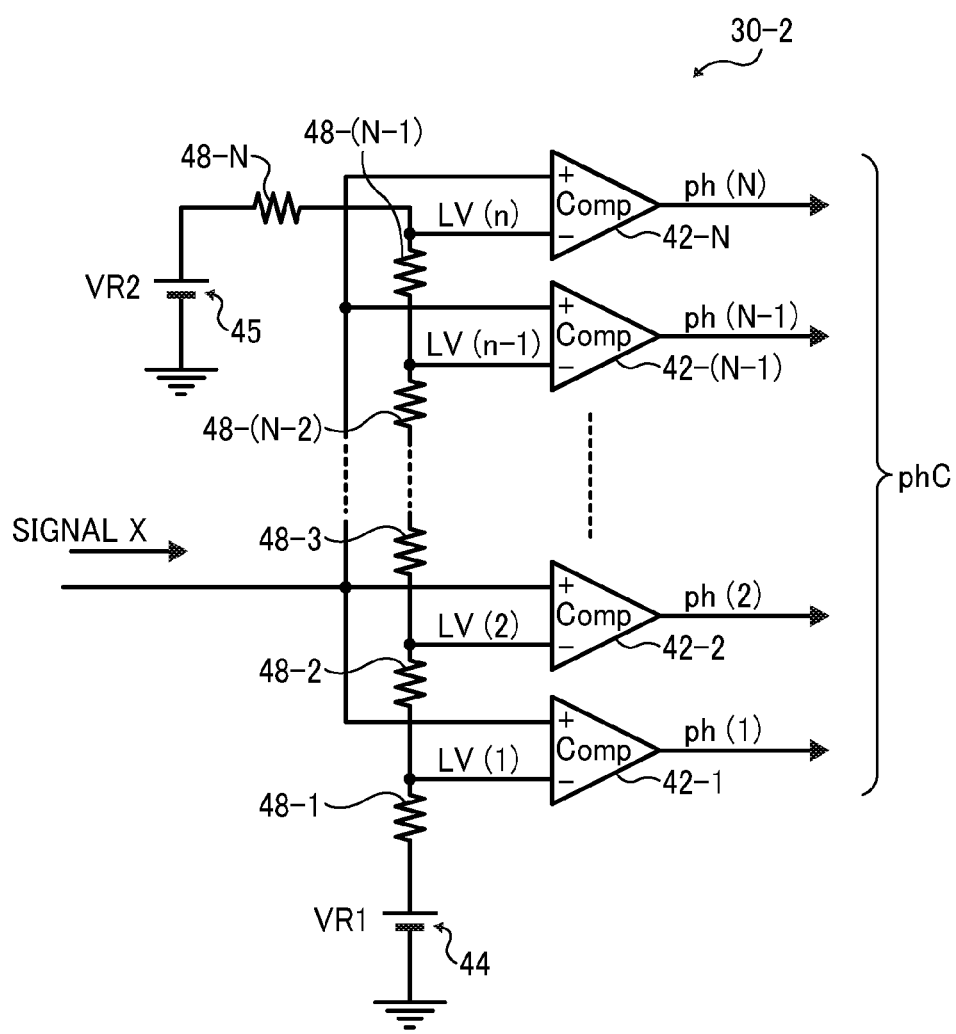
FIG. 7B is a circuit diagram of a structure of a phase detecting circuit according to an example 2 of the third phase detecting circuit in FIGS. 3, 5A, and 5B.

FIG. 7B is a circuit diagram of a structure of a phase detecting circuit 30-2 according to an example 2 of the third phase detecting circuit 30 in FIGS. 3, 5A, and 5B. In comparison with the phase detecting circuit 30-1 in FIG. 5A according to the example 1, the phase detecting circuit 30-2 according to the example 2 does not include a circuit lower than the voltage source 44 and the comparator 42-1. According to the example 2, as illustrated in FIG. 5B, even when the predetermined threshold level of the second phase detecting circuit 30-2 becomes a half, the effect similar to the effect of the phase detecting circuit 30-1 according to the example 1 is obtained, and the sizes of the motor driving apparatuses 102 and 102A can be reduced.

Subsequently, an exemplary signal synthesizing circuit 40 is described below which synthesizes the phase information signal phC from the third phase detecting circuit 30 with the phase information signals phA and phB respectively from the first phase detecting circuit 10 and the second phase detecting circuit 120 and outputs a two-phase digital signal.

Figure 8:
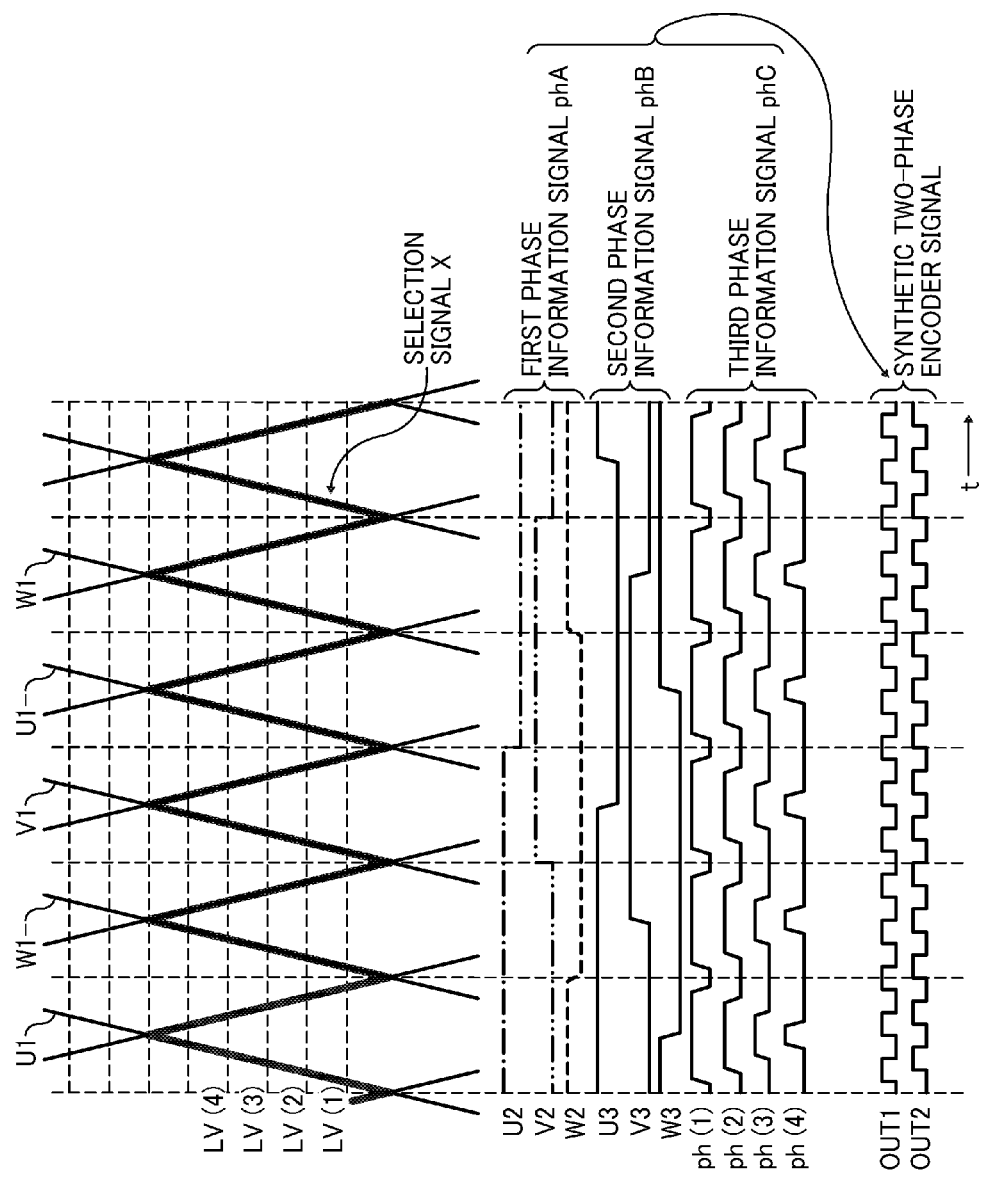
FIG. 8 is a timing chart of signals indicating operations of the third phase detecting circuit in FIGS. 3, 5A, and 5B.

FIG. 8 is a timing chart of signals indicating operations of the third phase detecting circuit 30 in FIGS. 3, 5A, and 5B. In FIG. 8, the selection signal X in FIG. 4 is indicated. Also, the third phase information signals phC from the third phase detecting circuit 30 having predetermined threshold levels LV (1) to LV (4) obtained by dividing a section of electrical angle 30° into five sections are indicated as phase information signals ph (1) to ph (4). The signal synthesizing circuit 40 outputs two kinds of output digital signals OUT1 and OUT2. The signal synthesizing circuit 40 synthesizes the phase information signals ph (1) and ph (3) with the comparison result signals U3, V3, and W3 and outputs the synthesis signal as the output digital signal OUT1. Subsequently, the signal synthesizing circuit 40 synthesizes the phase information signals ph (2) and ph (4) with the comparison result signals U2, V2, and W2 and outputs the synthesis signal as the output digital signal OUT2. Accordingly, an encoder signal having a period with ¼ phase difference can be easily obtained without including an optical encoder.

Third Embodiment

Figure 9:
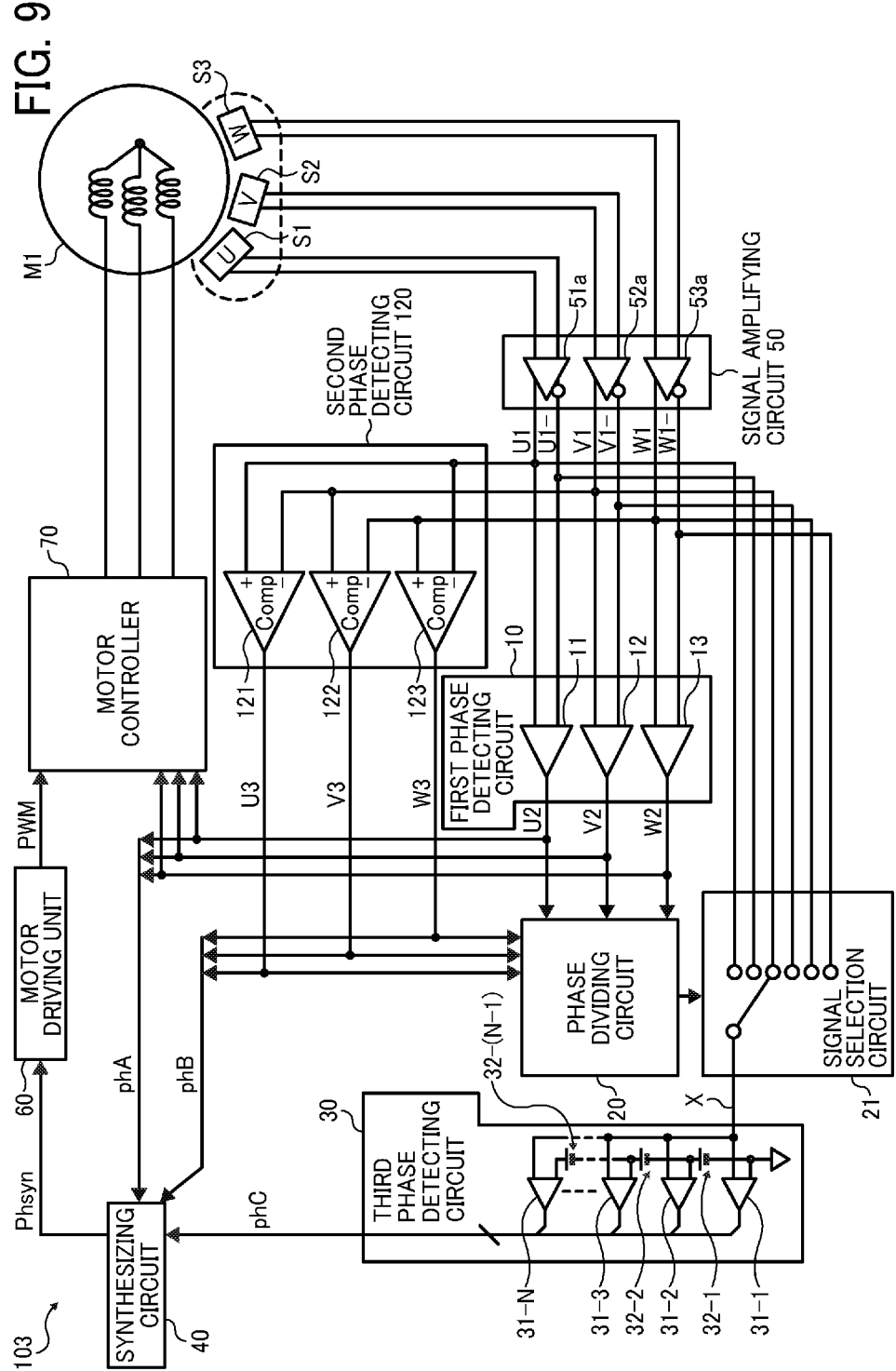
FIG. 9 is a block diagram of a structure of a motor driving apparatus according to a third embodiment of the present invention.

FIG. 9 is a block diagram of a structure of a motor driving apparatus (motor driving system) 103 for the image forming apparatus 200 in FIG. 1 according to a third embodiment of the present invention. As illustrated in FIG. 9, in comparison with the motor driving apparatus 102A according to the modification of the second embodiment in FIG. 5B, the motor driving apparatus 103 includes (1) a motor driving unit 70 which selectively supplies a driving current to a plurality of motor coils to rotate and drive a rotor of a motor M1 and (2) a motor controller 60 which generates a PWM signal based on a second phase information signal phB and outputs the PWM signal to the motor driving unit 70. Other components are the same as the components of the modification of the second embodiment, and the description of the other components is omitted.

Figure 10:
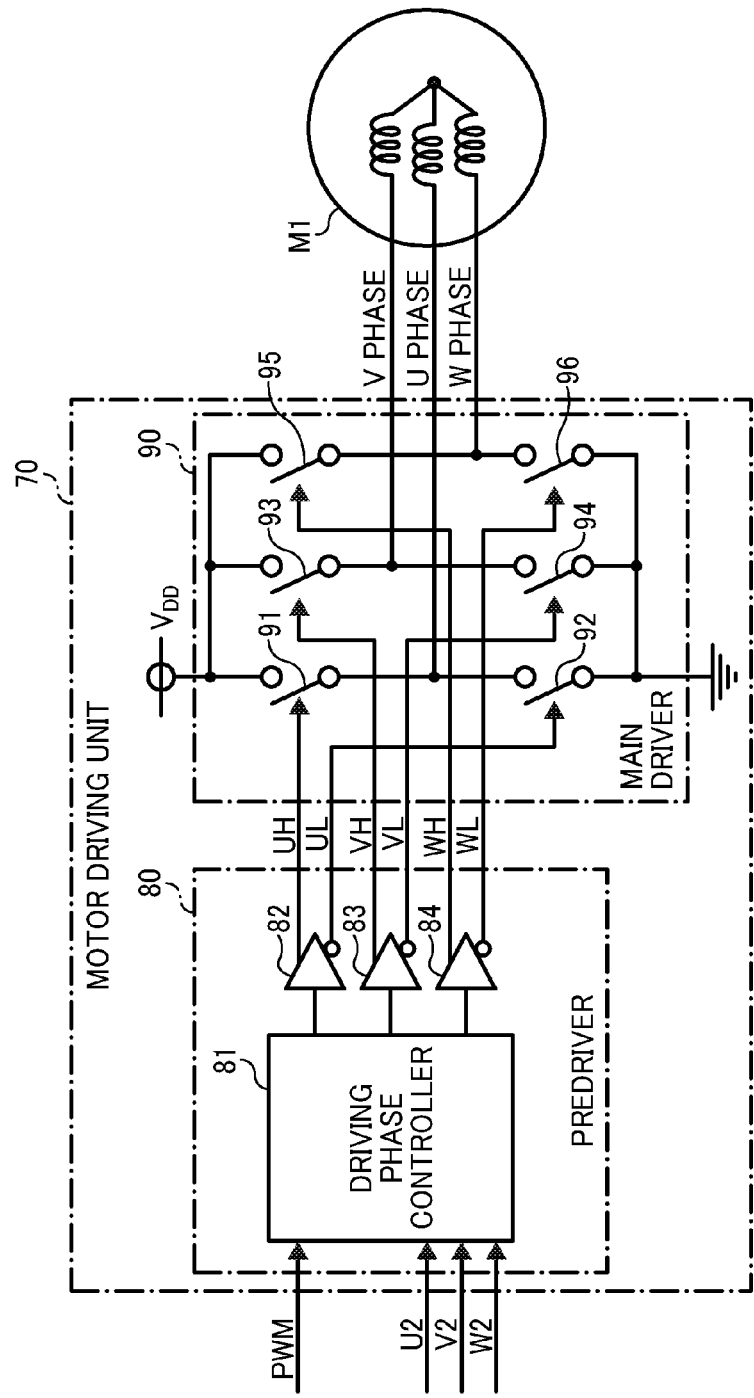
FIG. 10 is a circuit diagram of a structure of a motor driving unit in FIG. 9.

FIG. 10 is a circuit diagram of a structure of the motor driving unit 70 in FIG. 9. In FIG. 10, the motor driving unit 70 includes a predriver 80 and a driver 90. For example, it is assumed that a three-phase coil to drive the motor M1 which is a brushless DC motor have three phases, i.e., a U-phase, a V-phase, and a W-phase, and the coils form an Y connection in the motor M1. The main driver 90 includes high-side switch elements 91, 93, and 95 coupled to a side of a power source of the other ends of the coils and low-side switches 92, 94, and 96 coupled to a side of the ground. The predriver 80 outputs switch control signals UH, UL, VH, VL, WH, and WL to respectively drive the switch elements 91 to 96 having each phase. The predriver 80 includes a driving phase controller 81 and three drive amplifiers 82 to 84. The switch control signals UH, UL, VH, VL, WH, and WL are formed in pairs, and the driving phase controller 81 sorts the phases into the following states, i.e., a phase in which a synchronous rectification operation is performed at a PWM duty cycle, a phase in which the low-side is turned off, a phase in which both the high and low sides are turned off. The switch control signals UH, UL, VH, VL, WH, and WL drive the synchronous rectification phase according to the PWM signal with the duty cycle determined by the motor controller 60. Here, the phases are sorted into the states, that is, the state of the PWM synchronous rectification drive, the state in which the low side is turned on, and the state in which both sides are turned off. The motor M1 is rotated and driven by determining the phases according to the signal logics of the phase information signals U2, V2, and W2 generated based on the sensor signals respectively from the magnetic sensors Si to S3 to obtain position information arranged near the rotor of the motor M1.

Figure 11:
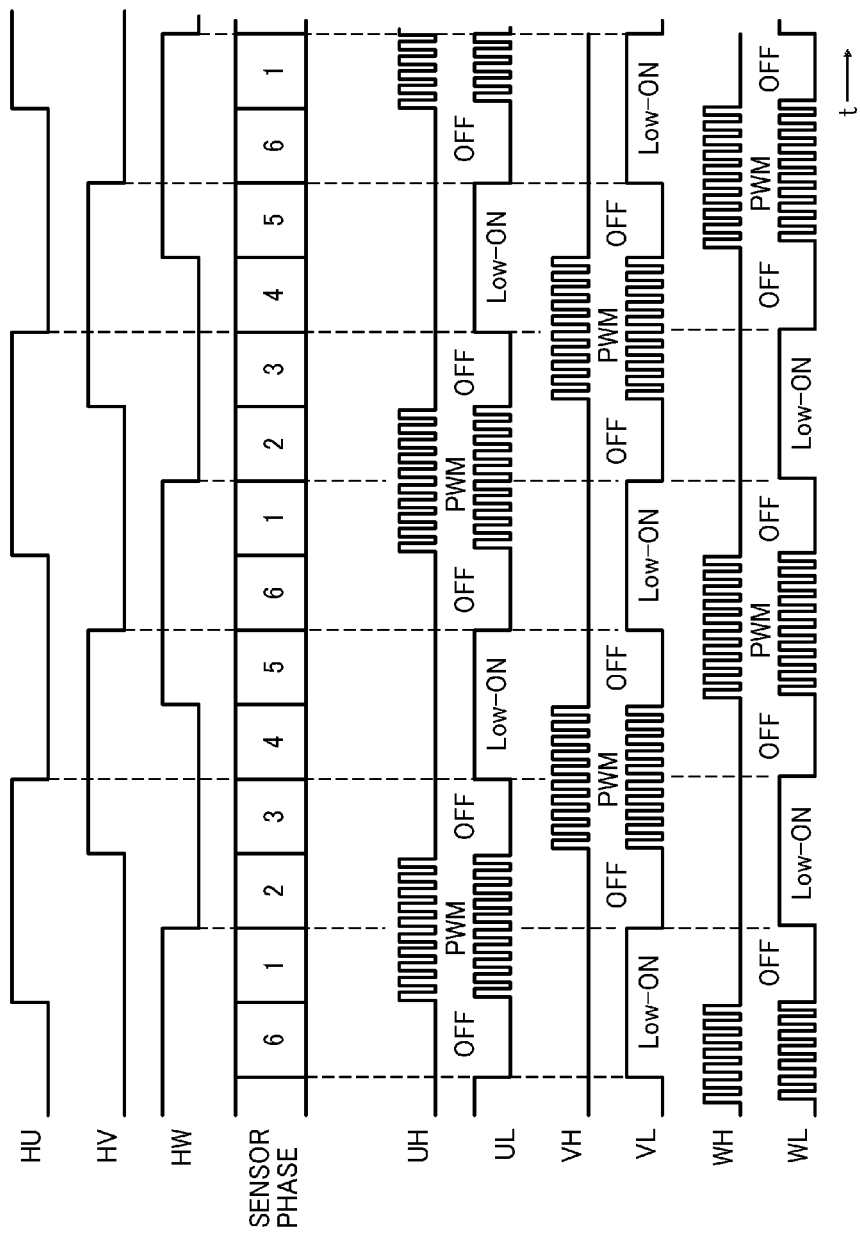
FIG. 11 is a timing chart of signals indicating operations of the motor driving unit in FIG. 10.

FIG. 11 is a timing chart of signals indicating operations of the motor driving unit 70 in FIG. 10. In FIG. 11, an example of state switching of the signal logic of the sensor signals having the respective phases is illustrated, and this example is a general driving method as a method for driving the brushless DC motor.

The motor controller 60 appropriately controls the duty cycle of the PWM signal based on the phase and position information on the rotating motor M1 which is accurate as possible and outputs the PWM signal to the motor driving unit 70. A drive control voltage may be input to the motor driving unit 70 instead of the PWM signal without providing the motor controller 60, and in the motor driving unit 70, the input drive control voltage may be compared with a triangular wave having a constant frame period to generate a PWM signal.

The sensors S1 to S3 for phase switching to drive the brushless motor and the plurality of sensors having the phase information described in the first embodiment and the second embodiment are used in common. This is the feature of the motor driving apparatus 103 in FIG. 9. In addition, the first phase detecting circuit 10 is also used in common. That is, since the sensor signal which has been traditionally used is used, much phase information can be obtained without providing an additional sensor.

Fourth Embodiment

Figure 12:
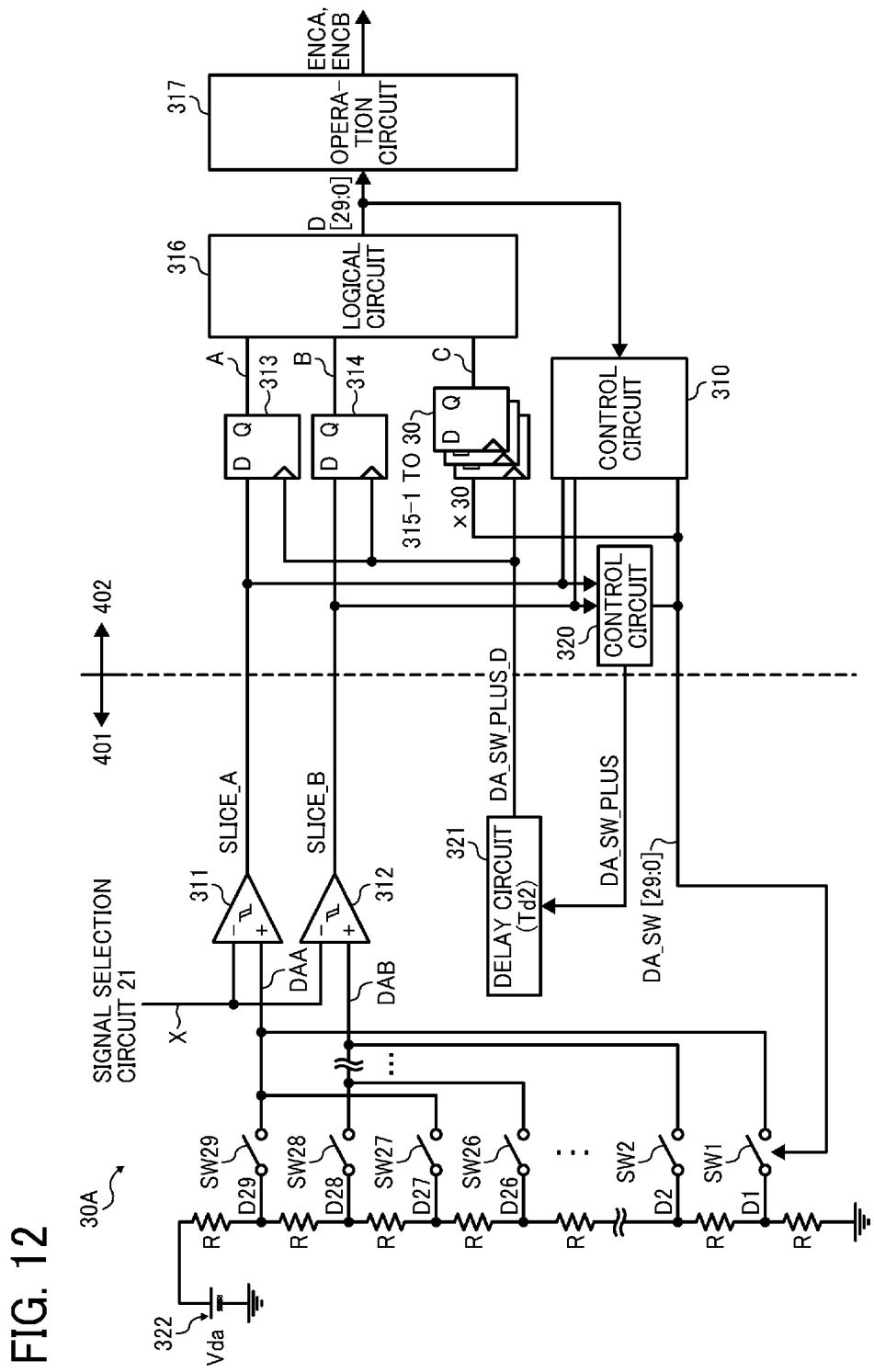
FIG. 12 is a block diagram of a structure of a phase detecting circuit according to a fourth embodiment of the present invention.
Figures 14A, 14B:
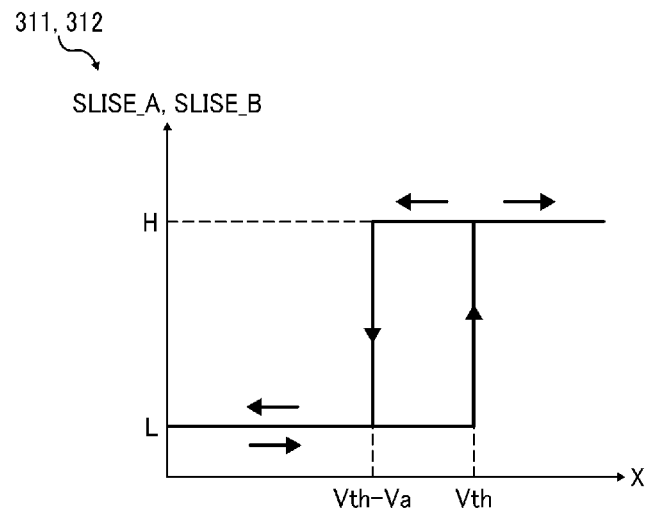
FIG. 14A is a graph of input output characteristics of hysteresis comparators in FIG. 12.
FIG. 14B is a truth table of an operation of a logical circuit in FIG. 12.
Figure 14C:
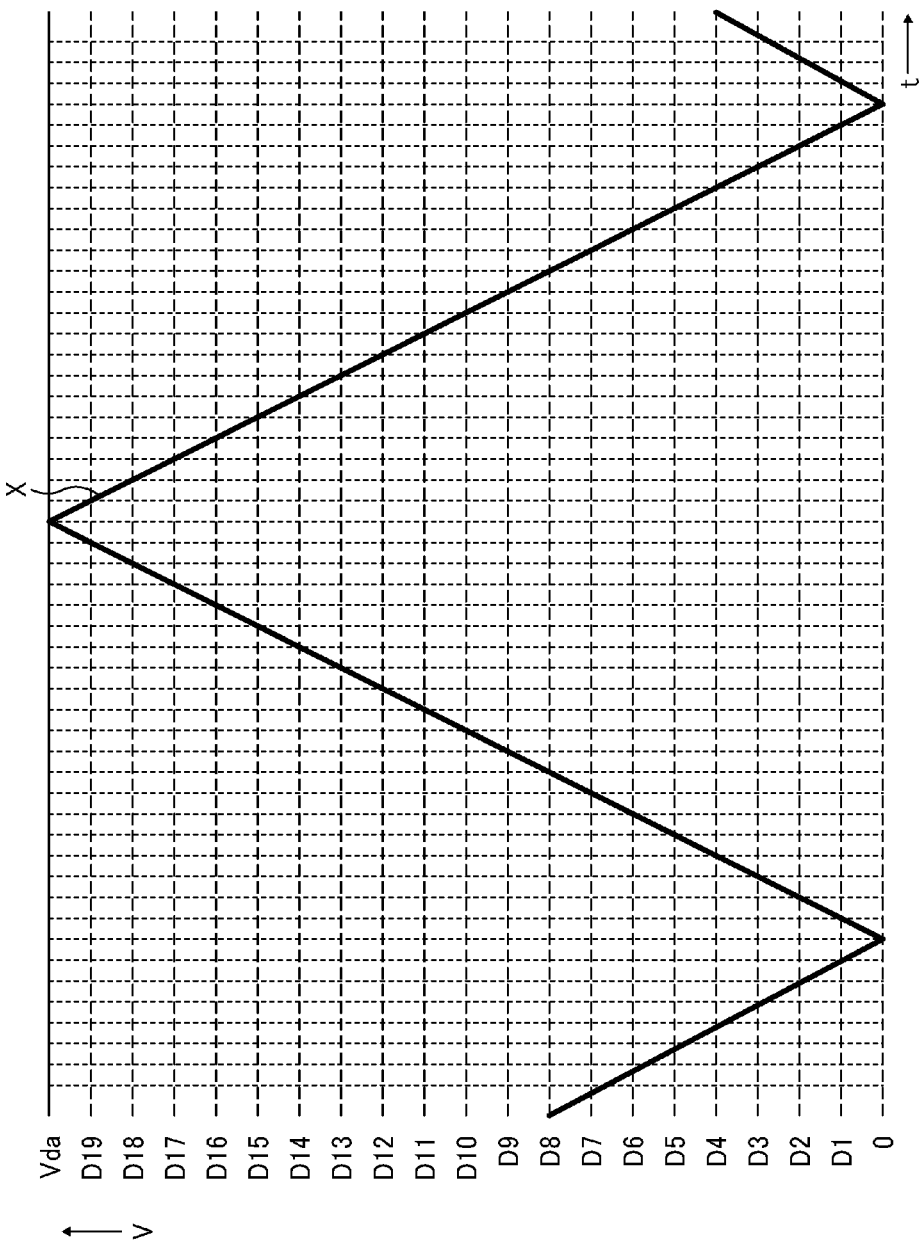
FIG. 14C is a graph of a selection signal in a case where a signal D [29:1] of the phase detecting circuit in FIG. 12 is simplified as signal voltages D19 to D1.
Figure 14D:
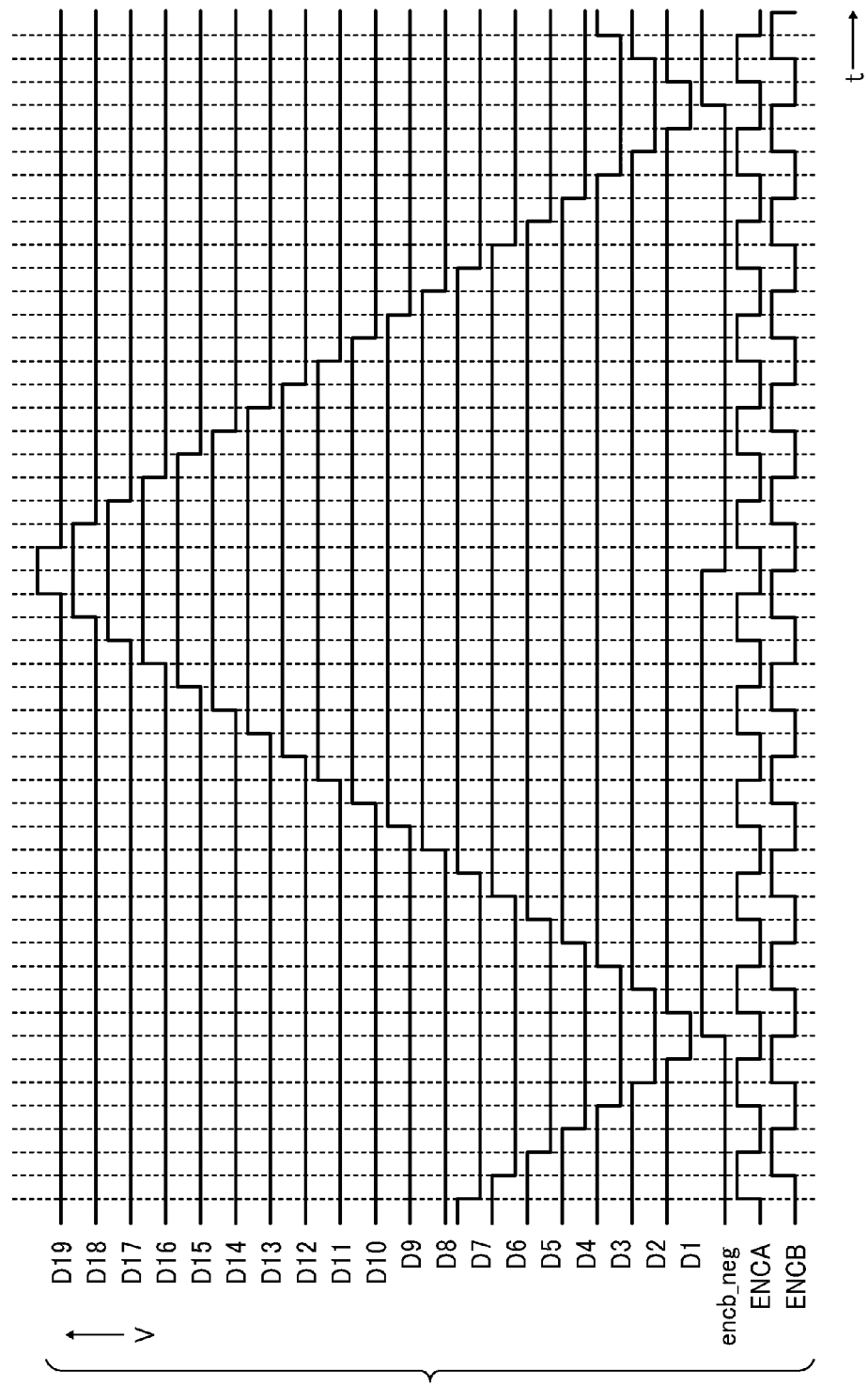
FIG. 14D is a timing chart of a case where the signal D [29:1] of the phase detecting circuit in FIG. 12 is simplified as the signal voltages D19 to D1.

FIG. 12 is a block diagram of a structure of a third phase detecting circuit (referred to as a phase detecting circuit below) 30A including a voltage level detecting device according to a fourth embodiment of the present invention. FIG. 13 is a timing chart of an operation of the phase detecting circuit 30A in FIG. 12. FIG. 14A is a graph of input output characteristics of hysteresis comparators (referred to as comparator below) 311 and 312 in FIG. 12. FIG. 14B is a truth table of an operation of a logical circuit 316 in FIG. 12. In FIG. 14B, the number "0x" indicates a hexadecimal digit. FIG. 14C is a graph of a selection signal in a case where a signal D [29:1] of the phase detecting circuit 30A in FIG. 12 is simplified as signal voltages D19 to D1. FIG. 14D is another timing chart of an operation of the phase detecting circuit 30A in FIG. 12. The structure, operation, and effect of the phase detecting circuit 30A in FIG. 12 are described below referring to FIGS. 12 to 14D.

In FIG. 12, the phase detecting circuit 30A is a modification of the phase detecting circuits 30 for the motor driving apparatuses 101, 102, 102A, and 103. For example, the phase detecting circuit 30A is provided to detect a rotation phase of a rotor of a motor M1 of an image forming apparatus 200. In particular, the phase detecting circuit 30A includes the two comparators 311 and 312. Each of the comparators 311 and 312 compares the signal selection signal X, which indicates the rotation phase of the motor from the signal selection circuit 21 in FIG. 3 and continuously changes, with a reference voltage (threshold level). The reference voltage of the comparator 311 is different from the reference voltage of the comparator 312. The reference voltages (threshold level) of the comparators 311 and 312 are switched based on a change signal indicating a change of the output signals from the comparators 311 and 312, and a control signal DA_SW [29:1] of the reference voltage is latched with a delayed signal. In the present embodiment, for example, phase detecting information signals ENCA and ENCB can be generated without the first phase detecting circuit 10 and the signal synthesizing circuit 40 in FIG. 3. In comparison with the first embodiment and the like, the circuit structure can be simplified. In addition, a motor phase can be accurately detected.

In FIG. 12, the phase detecting circuit 30A includes an analog circuit 401 and a digital circuit 402. The analog circuit 401 includes the comparators 311 and 312, a delay circuit (trigger signal output unit) 321, a reference voltage source 322, for example, 30 resistances R, and, for example, 29 switches SW1 to SW29. The digital circuit 402 includes a control circuit (controller) 310, a control circuit (detector) 320, delay flip-flops (delayed comparison result signal output unit) 313 and 314, delay flip-flops (delayed control signal output unit) 315-1 to 315-29, the logical circuit 316, and an operation circuit 317.

In the analog circuit 401, for example, the 29 voltages D1 to D29 are generated by using the 30 resistances R based on a reference voltage Vda of the reference voltage source 322. The voltages D1, D3, . . . , D29 having odd numbers are input to a non-inverted input terminal of the comparator 311 as reference voltages DAA respectively via the switches SW1, SW3, . . . , SW29. The voltages D2, D4, . . . , D28 having even numbers are input to a non-inverted input terminal of the comparator 312 as reference voltages DAB respectively via the switches SW2, SW4, . . . , SW28. For example, the selection signal X from the signal selection circuit 21 in FIG. 3 is input to each inverted input terminal of the comparators 311 and 312. The comparators 311 and 312 have a threshold Vth from the L level to the H level and a threshold Vth-Va from the H level to the L level and have hysteresis characteristics having a hysteresis delay time th. The two switches next to each other are turned on from among the switches SW1 to SW29 based on the control signal DA_SW [29:1] from the control circuit 310.

In the digital circuit 402 in FIG. 12, the flip-flop 313 outputs a comparison result signal SLICE_A upon the reception of a trigger pulse signal DA_SW PLUS_D (trigger signal) from the delay circuit 321 as a signal A. The flip-flop 314 outputs a comparison result signal SLICE_B upon the reception of the trigger pulse signal DA_SW_PLUS_D (trigger signal) from the delay circuit 321 as a signal B. The flip-flops 315-1 to 315-29 output the control signal DA_SW [29:1] upon the reception of the trigger pulse signal DA_S-W_PLUS_D (trigger signal) from the delay circuit 321 as a signal C.

The logical circuit 316 performs a logical operation with reference of the truth table in FIG. 14B based on the input signals A, B, and C and outputs a signal D which is the operation result to the control circuit 310 and the operation circuit 317. The comparison result signals and the signals A to D indicate as follows. (1) The comparison result signal SLICE_A indicates a comparison result of the selection signal X with the reference voltage DAA from one of the switches SW1, SW3, . . . , SW29 having odd numbers. (2) The comparison result signal SLICE_B indicates a comparison result of the selection signal X with the reference voltage DAB from one of the switches SW2, SW4, . . . , SW28 having even numbers. The reference voltages DAA and DAB are fixed values of the level of the signals D1 to D29 in FIG. 12, for example. The signals SLICE_A and SLICE_B which have respectively selected the reference voltages DAA and DAB are sequentially changed. (3) The signal A indicates the comparison result signal SLICE_A (delayed comparison result signal) upon the reception of the trigger pulse signal DA_SW_PLUS_D from the delay circuit 321. (4) The signal B indicates the comparison result signal SLICE_B (delayed comparison result signal) upon the reception of the trigger pulse signal DA_SW_PLUS_D from the delay circuit 321. (5) The signal C is a signal (delayed control signal) indicating the states of the switches SW1 to SW29. When the bit is one, the corresponding switch is turned on, and when the bit is zero, the corresponding switch is turned off. The two switches next to each other from among the 29 switches SW1 to SW29 are turned on. (6) For example, when the level of the selection signal is between the signal D4 and the signal D3, the signal D indicates a comparison result of the signals D29 to D1 with the selection signal by a bit string. Since the signals D29 to D4 are all "zero" and the signals D3 to D1 are all "one", the bit string expressed as binary numbers is "0000000000_0000000000_000000111b", and the bit string expressed as decimal numbers is "seven".

The operation of the logical circuit 316 is described below. As described above, two switches from among the switches SW1 to SW29 next to each other are turned on. In this case, three states may occur, i.e., a state 301 in which the voltage of the selection signal X is lower than the voltages of the two switches (referred to as two voltages below), a state 302 in which the voltage of the selection signal X is between the two voltages, and a state 303 in which the voltage of the selection signal X is higher than the two voltages (refer to FIG. 14B). An example of a logic calculation is described below. (1) For example, when the switches SW1 and SW2 are turned on and the state is the state 301 in which the voltage of the selection signal X is lower than the two voltages, the signals A and B are zero. The logical circuit 316 encodes the signal C=0x0000_0003, the signal A=0, and B=0 and outputs the output signal D=0x0000_0000 (state 306 in FIG. 13). (2) For example, when the switches SW1 and SW2 are turned on and the state is the state 302 in which the voltage of the selection signal X is between the two voltages, the signal A=1 and the signal B=0 are satisfied. The logical circuit 316 encodes the signal C=0x0000_0003 and A=1, B=0 and outputs the output signal D=0x0000_0001 (state 305 in FIG. 13). (3) For example, when the switches SW1 and SW2 are turned on and the state is the state 303 in which the voltage of the selection signal X is higher than the two voltages, the signal A=1 and the signal B=1 are satisfied. The logical circuit 316 encodes the signal C=0x0000_0003 and A=1, B=1 and outputs the output signal D=0x0000_0003 (state 306 in FIG. 13).

The operation circuit 317 performs a calculation on the output signal D to be input by using the following formulas (1) to (3) and generates and outputs the phase information signals ENCA and ENCB (corresponding to synthesized two-phase encoder signal in FIG. 8).

ENCA=(D[1]^D[3])|(D[5]^D[7])|(D[9]^D[11]|(D[13]^D[15])|(D[17]^D[19])|(D[21]^D[23])|(D[25]^D[27])|D[29]  (1)

(1) When encb_neg=1 is satisfied:

ENCB=(D[2]^D[4])|(D[6]^D[8])|(D[10]^D[12])|(D[14]^D[16])|(D[18]^D[20])|(D[22]^D[24])|(D[26]^D[28])  (2)

(2) When encb_neg=0 is satisfied:

ENCB=((D[2]^D[4])|(D[6]^D[8])|(D[10]^D[12])|(D[14]^D [16])|(D[18]^D[20])|(D[22]^D[24])|(D[26]^D[28]))  (3)

Here, the reference ^ indicates an EXOR operation for each bit, and the reference | indicates the division of the bit.

In FIG. 14C, the selection signal in a case where the signal D[29:1] of the phase detecting circuit 30A in FIG. 12 is simplified as signal voltages D19 to D1 is illustrated.

The control circuit 310 generates a 30-bit control signal DA_SW [29:1] which turns of the two switches next to each other from among the switches SW1 to SW29 based on the comparison result signals SLICE_A, SLICE_B, and D. The control signal DA_SW [29:1] is output to the control circuits 310 and 320, the flip-flops 315-1 to 315-29, and the switches SW1 to SW29. Specifically, the control circuit 310 operates the switches SW1 to SW29 so that one of the comparison result signals SLICE_A and SLICE_B becomes zero and the other signal becomes one. For example, when (SLICE_A, SLICE_B)=(0, 1) is changed to (SLICE_A, SLICE_B)=(0, 0) in a state where the switches SW2 and SW3 are turned on, the control circuit 310 turns off the switch SW3 and turns on the switch SW1 (state 307 in FIG. 13). That is, in the bit string of the signals D29 to D1, all higher-order bits than the voltage level of the selection signal are "zero", and all lower-order bits than the voltage level of the selection signal are "one". The control circuit 310 changes the signal DA_SW near the boundary between zero and one of the bit string of the signal D to "one" (=turn on) based on the changes of the comparison result signals SLICE_A and SLICE_B.

When the states of the comparison result signals SLICE_A and SLICE_B and the control signal DA_SW [29:1] are changed, the control circuits 320 generates an H-level one-shot pulse signal DA_SW_PLUS (detection signal) and outputs the signal to the delay circuit 321. The delay circuit 321 delays the input one-shot pulse signal DA_SW_PLUS by a predetermined delay time Td2 and generates the delayed trigger pulse signal DA_SW_PLUS_D. Then, the delay circuit 321 outputs the delayed trigger pulse signal to the flip-flops 313, 314, and 315-1 to 315-30. Here, for example, the delay time Td2 is set to be two μs which is obtained by adding a switching time of the switches SW1 to SW29, operation delay times of the comparators 311 and 312, and an operation delay time. In FIG. 13, for example, a delay time Td1 is set to be one μs which is obtained by adding the delay times of the comparators 311 and 312 and the output delay time. In this embodiment, the maximum value of an interval Tp is 5.5

The phase detecting circuit 30A formed as described above divides the phase section into 30 sections and detects the levels of 29 boundaries between the sections. When the comparison result of the comparison result signals SLICE_A and SLICE_B has been changed, the control circuit 320 detects the change and latches the states of the switches SW1 to SW29 to be the output signal D [29:1] with a signal obtained by delaying the timing of the detection result by the delay circuit 321 as a trigger. The operation circuit 317 encodes the output signal D [29:1] as described above and generates and outputs the phase detecting information signals ENCA and ENCB indicating phase positions.

An example of a specific operation is described referring to the timing chart in FIG. 13. When the voltage of the selection signal X is between the voltages D5 and D4, the non-inverted input terminal of the comparator 311 for outputting the comparison result signal SLICE_A which is the comparison result is coupled to the voltage D5 of the switch SW5, and the comparison result signal SLICE_A becomes the L level (0). Also, the non-inverted input terminal of the comparator 312 for outputting the comparison result signal SLICE_B which is the comparison result is coupled to the voltage D4 of the switch SW4, and the comparison result signal SLICE_B becomes the H level (1). When the voltage of the selection signal X falls below the voltage D28, the comparison result signal SLICE_B becomes the L level (0), and the comparison reference voltage of the comparator 311 is switched from the voltage D5 to the voltage D3 with the change of the voltage as a trigger. The flip-flops 315-1 to 315-30 latch the states of the switches SW1 to SW29 with the signal DA_SW_PLUS_D which is obtained by delaying the trigger, and the logical circuit 316 encodes the signals to output the signal D[29:1].

According to the phase detecting circuit 30A described above, from the change of the comparison result signal SLICE_A or the comparison result signal SLICE_B to the change of the encode level of the logical circuit 316 via the delay circuit 321, the switches of the comparison result signals SLICE_A and SLICE_B are not changed. Accordingly, when the signal is changed within a predetermined time due to a sudden change of the selection signal X, changes sequentially occur. Therefore, a change equal to or less than the delay time of the delay circuit 321 does not occur in the phase detecting information signals ENCA and ENCB which are encode output signals. In the present embodiment, for example, without providing the first phase detecting circuit 10 and the signal synthesizing circuit 40 in FIG. 3, the phase detecting information signals ENCA and ENCB can be generated. Therefore, in comparison with the first embodiment and the like, the circuit structure can be simplified. In addition, a motor phase can be accurately detected.

The phase detecting circuit 30A can asynchronously detect the motor phase by using two thresholds DAA and DAB which dynamically changes due to the change of the selection signal X without using a clock as described above. In comparison with the first embodiment and the like, the circuit structure of the phase detecting circuit 30A can be simplified. In addition, the phase detecting circuit 30A can accurately detect a motor phase. For example, in FIG. 13, the inclination of the selection signal X is changed according to the rotation speed of the motor. Therefore, it can be understood that an interval Tp between vertical lines become wider when the motor speed becomes lower. The interval Tp in FIG. 13 is similar to the interval between the vertical lines in FIGS. 14C and 14D. However, the interval between the vertical lines is Tp/2 in FIGS. 14C and 14D.

The output signal D[29:1] is expressed by the gray code in the truth table in FIG. 14B. The output signal D[29:1] is set so as to increase to apply one from the lower bit to the upper bit from the states of Nos. 1 to 3 in which the level is low to the state in which the level is high. The gray code in the present embodiment is not technically the same as a gray code of a gray code counter. Here, the gray code means that a one-bit change occurs at a change point. Since the change of one bit occurs at the change point, generation of an unnecessary glitch can be prevented when the operation circuit 317 encodes the phase detecting information signals ENCA and ENCB. Here, the glitch or a glitch noise means a whisker-like pulse generated in the output signal due to a difference between signal delay times when the signals are input at times close to each other.

As described above, according to the present embodiment, even when the number of the threshold levels is increased to more accurately detect a phase, a motor phase detector can be configured by using the two comparators 311 and 312. After the output changes of the comparators 311 and 312 cause a change signal and the change signal switches the comparison level, the output changes of the comparators 311 and 312 are latched with the signal which is obtained by delaying the comparison level switching signal. Therefore, the selection signal X can be input without considering a settling time. Therefore, according to the present embodiment, a voltage level detecting device can be provided which can detect the voltage level to more accurately detect the phase with more simple structure compared with a traditional phase detecting circuit.

The sensors S1 to S3 according to the present embodiment are magnetic sensors to detect the rotor of the motor M1, and a hall element is used as the sensors in general. There are many cases where the magnetic flux density generated by the rotation of the rotor is a sine wave. That is, the signal from the magnetic sensor is a sine wave in many cases. However, the magnetic flux density generated by the rotation of the rotor and received by the fixed magnetic sensor is not always a well-shaped sine wave and may be a distorted sine wave. Also, there is a case where a magnetic sensor output is saturated and forms a shape like a trapezoidal wave due to a magnetic saturation. The sensed magnetic flux density exceeds an allowable value of the magnetic sensor, and this causes the magnetic saturation. However, when the signal has a waveform of the sine wave or a wave form close to the sine wave in the section of electrical angle of −60° to 60°, a plurality of phases can be accurately detected according to the present invention.

In the above embodiments, the sensor signal may be also used as a sensor signal from a sensor for switching a commutation current of a plurality of coils of a motor current driving device.

In the above embodiments, the hysteresis comparators 311 and 312 are used. However, the present invention is not limited to this and may include a comparison units such as a comparator which does not have hysteresis characteristics.

In the above embodiments, the phase detecting circuit 30A includes the two comparators 311 and 312 which compare the signal selection signal X indicating the rotation phase of the motor from the signal selection circuit 21 in FIG. 3 and the like and continuously changes with the reference voltages (threshold) different from each other. However, the present invention is not limited to this, and it is preferable that the selection signal X indicate a predetermined signal phase.

In the above embodiments, the flip-flop 313, 314, and 315-1 to 315-30 are included. However, the present invention is not limited to the above structure, and it is preferable to include a storage unit which temporality stores or latches the input signal.

In addition to the above embodiments, a motor driving system according to the present invention may be used for a motor for driving a conveying roller in a sheet-shaped prepreg as a conveying device and a device for conveying a paper money.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A voltage level detecting device comprising:
   a plurality of comparators having a plurality of threshold levels different from each other based on a control signal and configured to compare a voltage level of an input signal to be changed with each threshold level to generate and output a comparison result signal indicating that the input signal has reached each threshold level;
   a detection circuit configured to detect a change in the comparison result signal and output a detection signal;
   a trigger signal output circuit configured to output a trigger signal when a predetermined time has elapsed after receiving the detection signal;
   a delayed control signal output circuit configured to output a delayed control signal indicating a value of the control signal at the timing when the trigger signal has been received;
   a delayed comparison result signal output circuit configured to output a delayed comparison result signal indicating the value of the comparison result signal at the timing when the trigger signal has been received;

a circuit configured to output a voltage level signal indicating a voltage level of the input signal based on the delayed control signal and the delayed comparison result signal; and a control circuit configured to output the control signal based on the voltage level signal and the comparison result signal.

2. The voltage level detecting device according to claim 1, wherein
the predetermined time is a time which exceeds an operation delay time of the plurality of comparators.

3. The voltage level detecting device according to claim 1, wherein
the voltage level signal is a signal indicating a comparison result with the threshold level.

4. The voltage level detecting device according to claim 1, wherein
the voltage level signal has an all zero bit in a state of a predetermined phase of the input signal and changes so as to sequentially increase from a lower order to a higher order of the voltage level signal.

5. The voltage level detecting device according to claim 4, wherein
the voltage level signal is expressed by a gray code which changes by one bit at a change point of the voltage level signal.

6. A motor driving apparatus comprising:
the voltage level detecting device according to claim 1; and
an additional control circuit configured to drive and control a motor based on a phase detecting information signal detected based on the voltage level signal.

7. A motor driving system comprising:
the motor driving apparatus according to claim 6; and
a motor configured to be driven and controlled by the additional control circuit.

8. An image forming apparatus comprising:
the motor driving system according to claim 7.

9. A conveyance device comprising:
the motor driving system according to claim 7.

10. A method for detecting a voltage level, comprising:
comparing a voltage level of an input signal to be changed with each threshold level of a plurality of comparators having a plurality of threshold levels different from each other based on a control signal, to generate and output a comparison result signal indicating that the input signal has reached each threshold level;

detecting a change in the comparison result signal to output a detection signal;

outputting a trigger signal when a predetermined time has elapsed after receiving the detection signal;

outputting a delayed control signal indicating a value of the control signal at the timing when the trigger signal has been received;

outputting a delayed comparison result signal indicating the value of the comparison result signal at the timing when the trigger signal has been received;

outputting a voltage level signal indicating a voltage level of the input signal based on the delayed control signal and the delayed comparison result signal; and outputting the control signal based on the voltage level signal and the comparison result signal.

11. The method according to claim 10, wherein
the predetermined time is a time which exceeds an operation delay time of the plurality of comparators.

12. The method according to claim 10, wherein
the voltage level signal is a signal indicating a comparison result with the threshold level.

13. The method according to claim 10, wherein
the voltage level signal has an all zero bit in a state of a predetermined phase of the input signal and changes so as to sequentially increase from a lower order to a higher order of the voltage level signal.

14. The method according to claim 13, wherein
the voltage level signal is expressed by a gray code which changes by one bit at a change point of the voltage level signal.

* * * * *